United States Patent
Lapierre

(10) Patent No.: US 10,012,056 B1
(45) Date of Patent: Jul. 3, 2018

(54) METHOD FOR FORECASTING WELL PRODUCTION AND DETERMINING ULTIMATE RECOVERIES USING BUBBLE POINT DECLINE CURVE ANALYSIS

(71) Applicant: Shale Specialists, LLC, Houston, TX (US)

(72) Inventor: Scott Lapierre, Houston, TX (US)

(73) Assignee: Shale Specialists, LLC, Houston, TX (US)

(*) Notice: Subject to any disclaimer, the term of this patent is extended or adjusted under 35 U.S.C. 154(b) by 0 days.

(21) Appl. No.: 15/702,509

(22) Filed: Sep. 12, 2017

Related U.S. Application Data

(60) Provisional application No. 62/555,578, filed on Sep. 7, 2017, provisional application No. 62/491,953, filed on Apr. 28, 2017.

(51) Int. Cl.
| | |
|---|---|
| *G01V 1/40* | (2006.01) |
| *G01V 3/18* | (2006.01) |
| *G01V 5/04* | (2006.01) |
| *G01V 9/00* | (2006.01) |
| *E21B 41/00* | (2006.01) |
| *E21B 47/04* | (2012.01) |
| *E21B 47/06* | (2012.01) |

(Continued)

(52) U.S. Cl.
CPC .......... *E21B 41/0092* (2013.01); *E21B 47/04* (2013.01); *E21B 47/06* (2013.01); *E21B 47/065* (2013.01); *E21B 49/08* (2013.01); *G06N 5/02* (2013.01); *E21B 43/26* (2013.01)

(58) Field of Classification Search
None
See application file for complete search history.

(56) References Cited

U.S. PATENT DOCUMENTS

| | | | |
|---|---|---|---|
| 5,612,493 A | 3/1997 | Alexander | |
| 6,101,447 A * | 8/2000 | Poe, Jr. ................... | E21B 49/00 702/13 |

(Continued)

OTHER PUBLICATIONS

Yousuf, New Models for Time-Cumulative Behavior of Unconventional Reservoirs—Diagnostic Relations, Production Forecasting, and EUR Methods, Unconventional Resources Technology Conference (URTeC), 2016.*

(Continued)

*Primary Examiner* — Roy Y Yi
(74) *Attorney, Agent, or Firm* — Vincent Musgrove; Craige Thompson; Thompson Patent Law

(57) ABSTRACT

Apparatus and associated methods relate to a decline curve analysis method for predicting oil and gas production from an oil well, where a prediction curve for oil and/or gas data transitions from a first characteristic function to a second characteristic function at the bubble point. In an illustrative example, the first and second characteristic functions may be of the monotonically decreasing type. A distinction between the two characteristic functions may be that the absolute value of the decline for the second characteristic function is greater than or equal to the absolute value of the decline of the first characteristic function for each value of time and/or cumulative oil/gas past the bubble point. In various embodiments, the method may give more accurate predictions for oil and/or gas production once the stimulated reservoir volume reaches the bubble point.

20 Claims, 16 Drawing Sheets

(51) Int. Cl.
*E21B 49/08* (2006.01)
*G06N 5/02* (2006.01)
*E21B 43/26* (2006.01)

(56) References Cited

U.S. PATENT DOCUMENTS

| | | | |
|---|---|---|---|
| 6,842,700 B2 | 1/2005 | Poe | |
| 7,369,979 B1 | 5/2008 | Spivey | |
| 2009/0020284 A1 | 1/2009 | Graf et al. | |
| 2011/0307227 A1 | 12/2011 | Poe | |
| 2014/0121976 A1* | 5/2014 | Kischkat | E21B 49/082 702/11 |
| 2014/0136111 A1* | 5/2014 | Rossi | E21B 43/00 702/6 |

OTHER PUBLICATIONS

Saeed Salehinia, Forecasting density, oil formation volume factor and bubble point pressure of crude oil systems based on nonlinear system identification approach, Journal of Petroleum Science and Engineering, May 2016.*

Kanfar, Comparison of Empirical Decline Curve Analysis for Shale Wells, University of Texas A&M, Aug. 2013.*

SPE International, Types of decline analysis in production forecasting, PetroWiki, May 31, 2016, [online], [retrieved on May 15, 2017] Retrieved from the Internet: <URL:http://petrowiki.org/Types_of_decline_analysis_in_production_forecasting>.

IHS Energy, Decline Analysis, IHS Harmony, May 3, 2017, [onine], [retrieved on May 18, 2017] Retrieved from the Internet: <URL: https://cdn.ihs.com/fekete/help/Harmony/content/html_files/performing_an_analysis/decline_analysis/decline.htm>.

IHS, Inc., Traditional Decline Analysis Theory, 2014, [online], [retrieved on May 15, 2017] Retrieved from the Internet: <URL: http://www.fekete.com/SAN/WebHelp/FeketeHarmony/Harmony_WebHelp/Content/HTML_Files/Reference_Material/Analysis_Method_Theory/Traditional_Decline_Theory.htm>.

Agarwal, Ram G., Gardner, David C., Kleinsteiber, Stanley W., and Fussell, Del D., Analyzing Well Production Data Using Combined-Type-Curve and Decline-Curve Analysis Concepts, Mar. 5, 2011, [online], [retrieved on May 18, 2017] Retrieved from the Internet: <URL: https://wenku.baidu.com/view/77c38fd6c1c708a1284a44a2.html>.

* cited by examiner

METHOD FOR FORECASTING WELL PRODUCTION AND DETERMINING ULTIMATE RECOVERIES USING BUBBLE POINT DECLINE CURVE ANALYSIS

CROSS-REFERENCE TO RELATED APPLICATIONS

This application claims the benefit of U.S. Provisional Application Ser. No. 62/555,578, titled "Skeptical Articles," filed by Scott Lapierre on Sep. 7, 2017, and also claims the benefit of U.S. Provisional Application Ser. No. 62/491,953, titled "Method for Forecasting Well Production and Determining Ultimate Recoveries Using Bubble Point Decline Curve Analysis," filed by Scott Lapierre on Apr. 28, 2017.

This application incorporates the entire contents of the foregoing application(s) herein by reference.

TECHNICAL FIELD

Various embodiments relate generally to oil and gas production forecasting.

BACKGROUND

Extraction of petroleum (e.g., oil) is the process by which usable petroleum is drawn out from beneath the earth's surface. The amount of oil that is recoverable is determined by a number of factors, including the permeability of the rocks, the strength of natural drives, porosity of the reservoir rock, and the viscosity of the oil. When the reservoir rocks are "tight" such as in shale, oil generally cannot flow through, but when they are permeable such as in sandstone, oil flows freely.

SUMMARY

Apparatus and associated methods relate to a decline curve analysis method for predicting oil and gas production from an oil well, where a prediction curve for oil and/or gas data transitions from a first characteristic function to a second characteristic function at the bubble point. In an illustrative example, the first and second characteristic functions may be of the monotonically decreasing type. A distinction between the two characteristic functions may be that the absolute value of the decline for the second characteristic function is greater than or equal to the absolute value of the decline of the first characteristic function for each value of time and/or cumulative oil/gas past the bubble point. In various embodiments, the method may give more accurate predictions for oil and/or gas production once the stimulated reservoir volume reaches the bubble point.

Various embodiments may achieve one or more advantages. For example, some embodiments may account for drive mechanisms which may accurately predict the production capacity of a given oil well. In an exemplary embodiment, various estimation methods may provide more realistic projections for oil and/or gas production. In some embodiments, a method for determining the bubble point may give more reliable estimates of when the bubble point will be reached in the future. In some examples, various methods for predicting the occurrence of the bubble point may provide for a more comprehensive set of estimates that can be used in planning oil field development. In various embodiments, the present decline curve analysis method may provide more flexibility and adaptability.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

The primary drive mechanism causing oil production to flow to the surface from a hydraulically stimulated (fracked) shale oil reservoir "ends" once the oil phase present in situ reduces to its bubble point. Textbook pressure/volume/temperature (PVT) data measured from actual reservoir fluids illustrates the phenomenon of oil expansion terminating at the bubble point. It is at this point where dissolved gases evolve from the fluid phase and begin to dominate production (note that all references to "gas" in this specification refer to natural gas). As a result, reservoir oil production expectations decrease once the stimulated reservoir volume reaches the bubble point. In such a case, the ratio of produced gas to produced oil (gas-to-oil ratio or GOR) will steadily increase over the early life of these wells with the liquids production falling off faster than expected. Various embodiments embodying solutions to the problem of how to incorporate this reality into the method of decline curve analysis is disclosed herein.

The primary liquid recovery method may be limited to (1) expansion of oil, and (2) some small compression of void space. Improvements can be made to the prediction of actual well performance by combining two different characteristic decline functions. Such assumptions are contrary to the basic assumption in modern decline curve analysis that whatever causes controlled the trend of a curve in the past will continue to govern its trend in the future in a uniform manner. In various embodiments, the forecasting method may dramatically reduce the forecasted amount of oil production visible on longer-lived wells. Various embodiments may yield improved forecasts of actual production data, for example.

Figure 1:
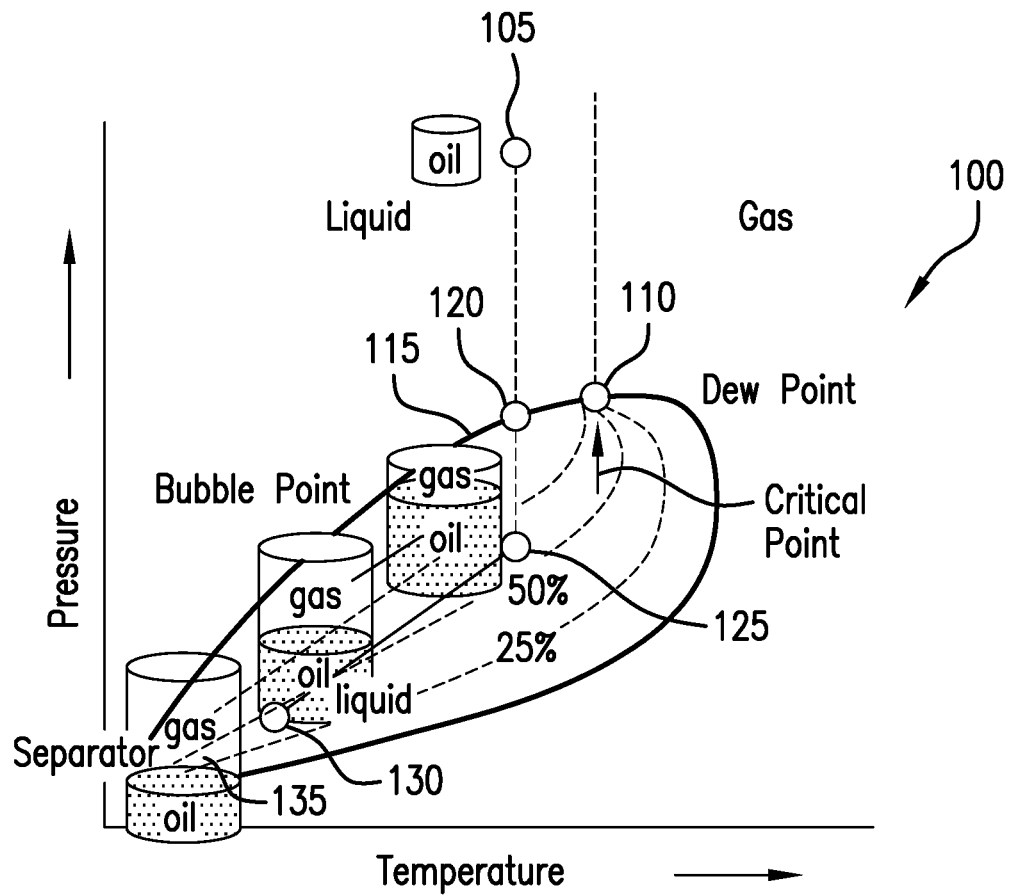
FIG. 1 depicts a phase diagram illustrating an exemplary change in the gas-to-oil ratio (GOR) trend once the bubble point is reached.

FIG. 1 depicts a phase diagram illustrating an exemplary change in the gas to oil ratio trend once the bubble point is reached. A phase diagram 100 shows the various states of matter that oil and gas progress through in a typical oil drilling operation. An oil well is drilled to access liquid oil 105 underground at a high pressure and moderate temperature. Oil possesses a specific liquid-vapor critical point 110 at which liquid oil and gas vapor can coexist. A bubble point phase boundary 115 defines a pressure and temperature boundary at which bubbles of gas comes out of solution in oil (as used herein, the "bubble point").

As the pressure of the liquid oil 105 in a well decreases due to extracting oil out of the well, the liquid oil 105 in the well approaches the bubble point phase boundary 115. Once the liquid oil 105 in the well reaches a bubble point 120, gas begins to come out of solution in the oil. As the pressure continues to drop, the oil/gas combination in the well may move through various stages within the bubble point phase boundary 115. At a first oil/gas phase 125 (lower in pressure than the bubble point 120), there is a relatively small percentage of gas out of solution versus liquid oil. As the temperature and pressure drop, the first oil/gas phase 125 transitions toward a second oil/gas phase 130 defined by a more balanced volume of vapor gas versus liquid oil. The temperature and pressure continues to drop until the second oil/gas phase 130 reaches a third oil/gas phase 135 defined by a high percentage of gas relative to the amount of oil in the well.

Figure 2:
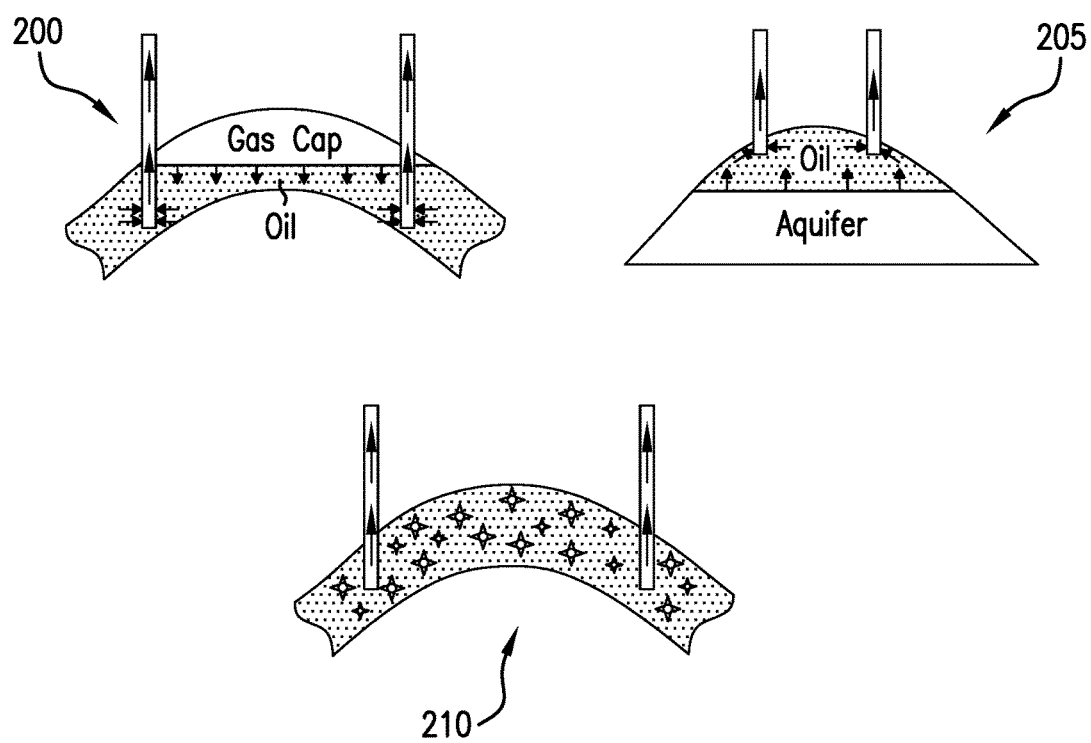
FIG. 2 depicts an illustration of various exemplary reservoir drive mechanisms.

FIG. 2 depicts an illustration of various exemplary reservoir drive mechanisms. Various drive mechanisms are described in the literature and have varying capabilities for recovery efficiency. For example, a gas cap expansion drive 200 is where decreasing reservoir pressure causes a release of dissolved gas which gravity separates into a gas cap, which then maintains pressure on the liquid oil, which drives the oil up into the well. Another drive mechanism is a water drive 205, where an aquifer exerts pressure on the liquid oil to drive it up into the well. A drive mechanism associated with the bubble point phase transition is a solution gas expansion drive 210. When the gas comes out of solution in oil, this creates a pressure which can drive the oil up into a well, but like gas cap expansion, produces maximum recovery efficiency when the released gases are free to gravity separate into gas cap on top of oil.

Figure 3:
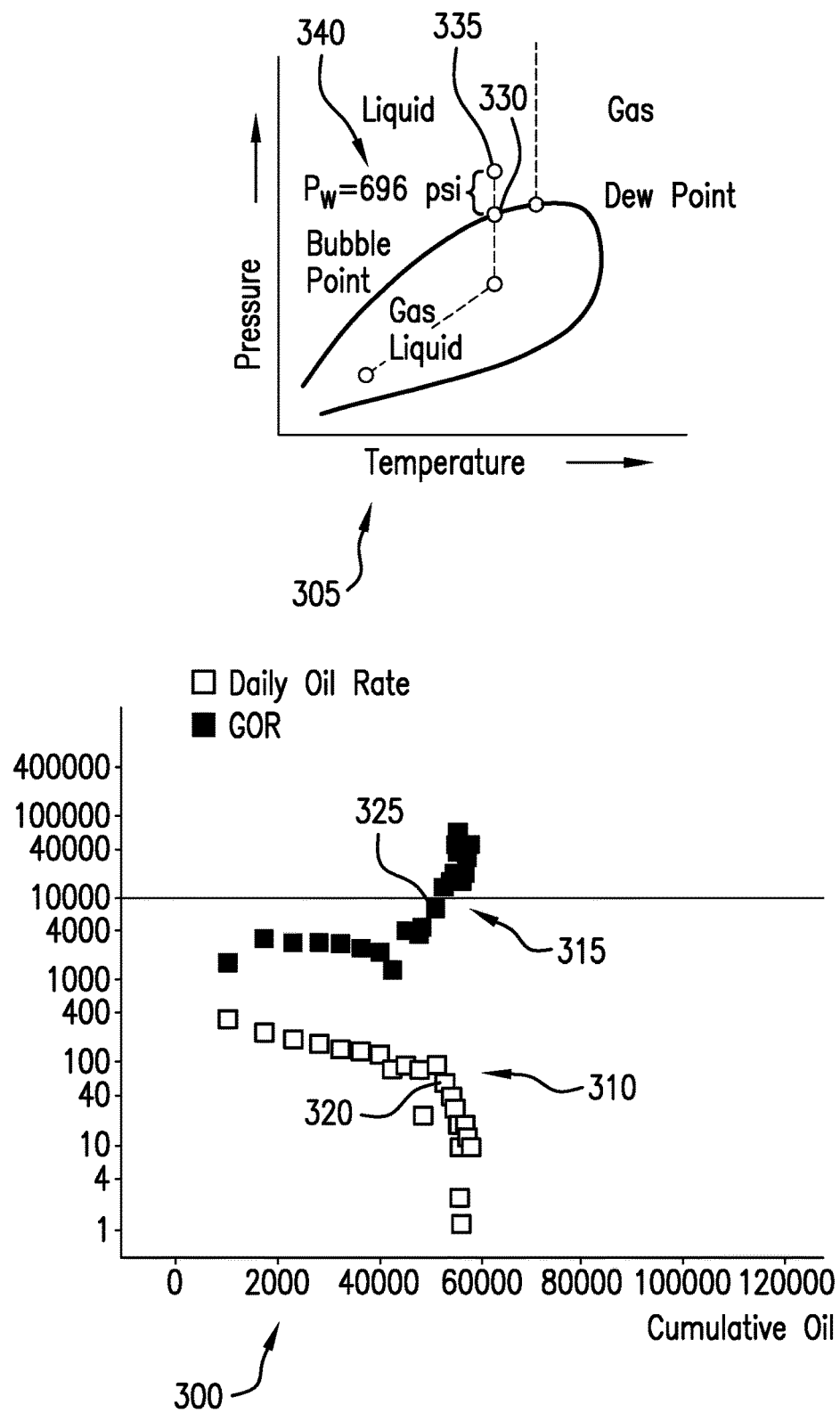
FIG. 3 depicts a graph of exemplary empirical data illustrating the occurrence of a bubble point along with an exemplary corresponding phase diagram showing the bubble point has been reached.

FIG. 3 depicts a graph of exemplary empirical data illustrating the occurrence of a bubble point along with an exemplary corresponding phase diagram showing the bubble point has been reached. An oil and GOR vs. cumulative oil graph 300 shows empirical data reflecting oil production. A pressure vs. temperature graph 305 illustrates the phase transitions occurring as reflected by the data in the oil and GOR vs. cumulative oil graph 300.

In the oil and GOR vs. cumulative oil graph 300, daily oil rate vs. cumulative oil data 310 are shown as light data points, while GOR vs. cumulative oil data 315 are shown as dark data points. Each dataset illustrates inflection points 320 and 325 at which the oil attains its bubble point. At the inflection points 320 and 325, the ratio of gas versus oil coming out of the well increases dramatically due to the oil/gas solution passing through the bubble point threshold.

The pressure vs. temperature graph 305 illustrates this phase transition. The inflection points 320 and 325 correspond to a bubble point 330 (the point at which gas starts to come out of solution in oil). The difference in pressure between an initial point 335 and the bubble point 330 is defined as a working pressure ($P_w$) 340. In the depicted exemplary case, the working pressure 340 is 696 psi.

Figure 4:
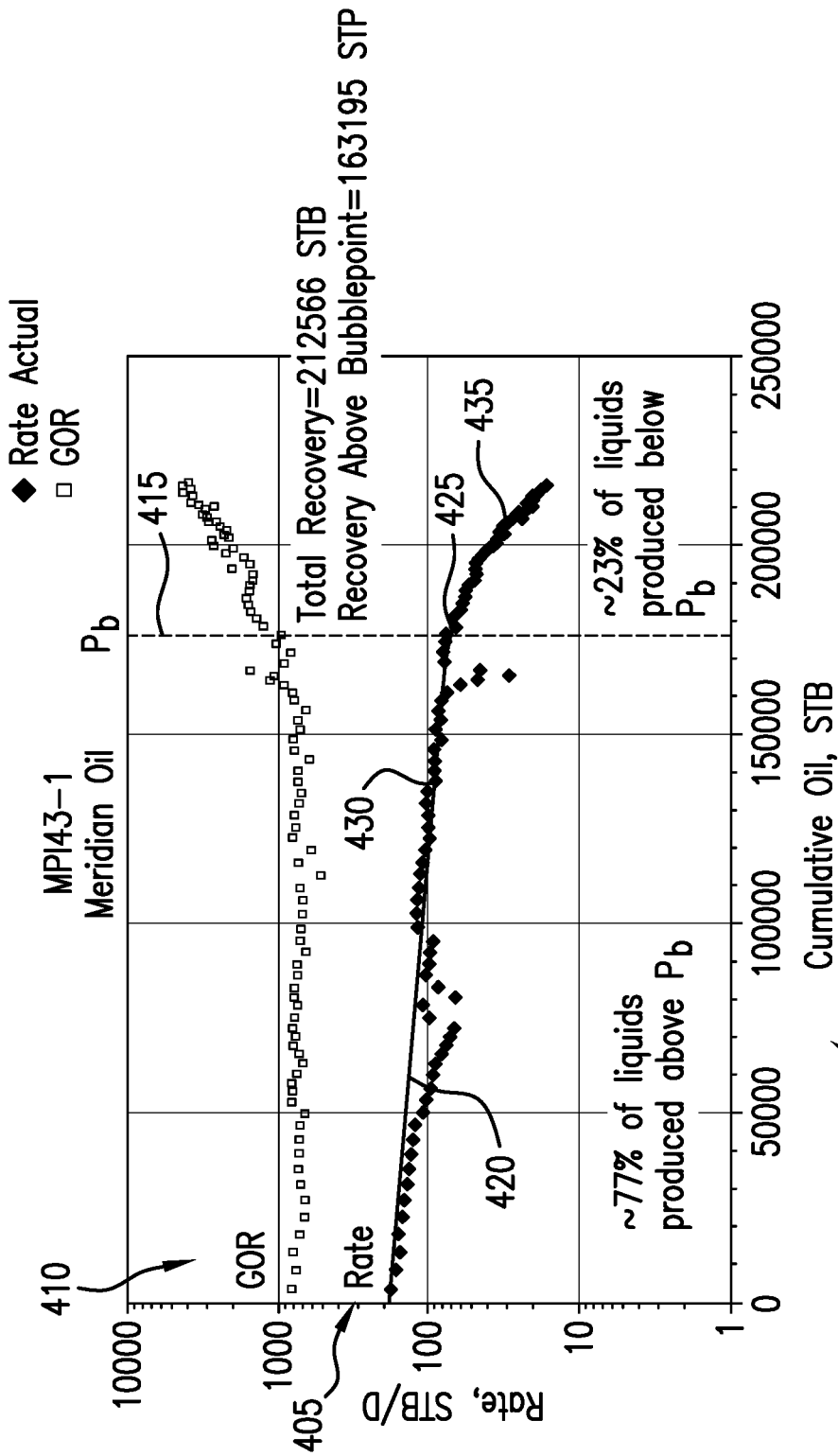
FIG. 4 depicts a graph of empirical data illustrating the occurrence of a bubble point along with an exemplary curve fitted to the data, where the curve transitions from a first characteristic function to a second characteristic function near the bubble point.

FIG. 4 depicts a graph of exemplary empirical data illustrating the occurrence of a bubble point along with an exemplary curve fitted to the data, where the curve transitions from a first characteristic function to a second characteristic function near the bubble point. An oil and GOR vs. cumulative oil graph 400 shows a daily oil rate vs. cumulative oil data 405 as dark data points and a GOR vs. cumulative oil data 410 as light data points. A bubble point (Pb) 415 for this data occurs at around 175,000 cumulative oil stock tank barrels (STB) and a GOR of 1,000. A fitted curve 420 has been fitted to the daily oil rate vs. cumulative oil data 405.

When the bubble point 415 is reached, the fitted curve 420 makes a transition 425 from a first characteristic function (CF1) 430 to a second characteristic function (CF2) 435. The first and second characteristic functions 430 and 435 are generally of the monotonically decreasing type. The primary distinction between the two characteristic functions is that the absolute value of the decline for the second characteristic function 435 is greater than or equal to the absolute value of the decline of the first characteristic function for each value of time and/or cumulative oil/gas past the bubble point. This steeper decline can be seen as a steep drop off in the fitted curve 420 once the bubble point 415 has been reached. Mathematically, this can be described as:

$$\left|\frac{d}{dt}(CF2(t))\right| \geq \left|\frac{d}{dt}(CF1(t))\right| \text{ for } t > t_{bubble\ point}$$

The effective decline rate is also useful in analyzing the drop in a well's production rate over a specific time period. The effective decline rate (D) is a stepwise function defined as the drop in production rate from $q_0$ to $q_1$ over a specific time period:

$$D = \frac{q_0 - q_1}{q_0}$$

The effective decline rate is the proportion by which the production rate reduces over a given time period. The distinction between the first and second characteristic functions 430, 435 can also be mathematically described using the effective decline rate as follows:

$$|D_{CF2}(q_0,q_1)| \geq |D_{CF1}(q_0,q_1)| \text{ for } q_0, q_1 > q_{bubble\ point}$$

For the fitted curve 420 in FIG. 4, the curve is initially defined by the first characteristic function 430. At the transition point 425 (corresponding to the bubble point 415), the fitted curve 420 possesses a specific effective decline rate ($D_{bubble\ point}$). This specific effective decline rate at the bubble point may then be used as the instantaneous effective decline rate of the second characteristic function 435. The exact time (or cumulative oil/gas/barrel of oil equivalent value) at which the bubble point 415 is reached can be determined in a variety of ways that will be described below.

In a preferred embodiment, the first characteristic function 430 may be characterized by a hyperbolic function according to the Arps Equation:

$$q = q_0(1 + bD_i t)^{-\frac{1}{b}},$$

while the second characteristic function 435 may be characterized by an exponential function according to the Arps Equation (with the parameter b set to zero):

$$q = q_0 e^{-tD_i}$$

The exponential form of the Arps Equation generally possesses a steeper decline versus the hyperbolic form for the same values of $q_0$ and $D_i$. The effective decline rate (D) is a constant only for an exponential decline. In contrast, the effective decline rate decreases with time for a hyperbolic decline.

Figure 5:
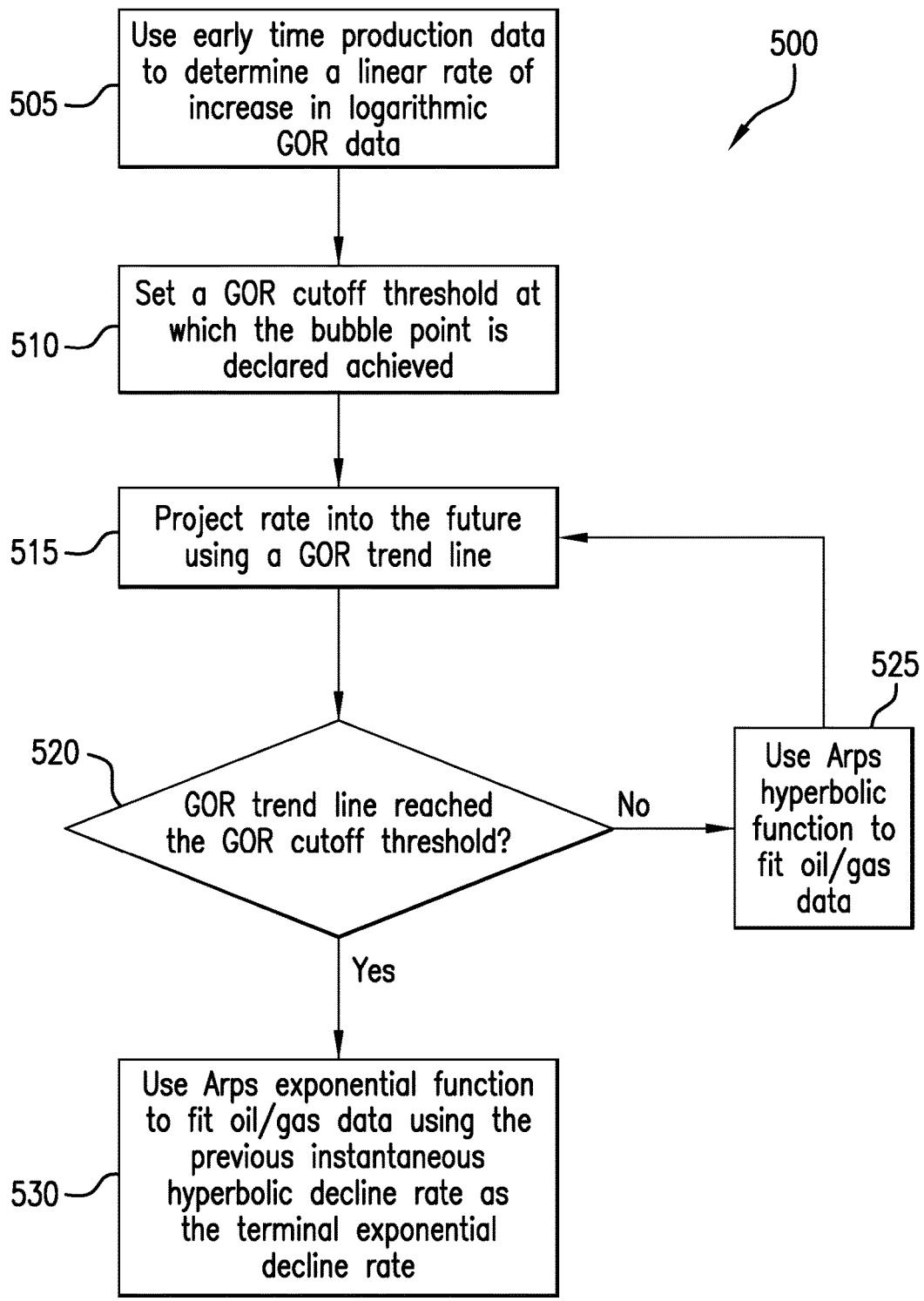
FIG. 5 depicts a flow chart illustrating an exemplary use of a gas-to-oil ratio (GOR) trend to determine the moment of occurrence of a bubble point.

FIG. 5 depicts a flow chart illustrating exemplary use of a gas-to-oil ratio (GOR) trend to determine the moment of occurrence of a bubble point. A GOR trend method 500 for determining the bubble point threshold begins with a first step 505 of using early time production data to create a linear trend in the increase in empirical GOR data on a logarithmic scale. In a second step 510, a specific GOR level is set at which the bubble point is declared achieved. In a third step 515, the GOR trend is projected into the future.

In a fourth (decision) step 520, the future projection of the GOR trendline is compared to the GOR cutoff threshold set in the second step 510. If the GOR trendline has not yet reached the GOR cutoff threshold, then a hyperbolic Arps function is used to fit the oil and/or gas data in a fifth step 525, and the GOR trendline continues to be projected into the future (back to the third step 515). If, after projecting the GOR trendline the GOR trendline has reached the GOR cutoff threshold, then an exponential Arps function is used to fit the oil and/or gas data in a sixth step 530 using the previous hyperbolic Arps decline rate as the terminal exponential Arps decline rate. In this sense, the curve fitted to the oil and/or gas data switches from hyperbolic to exponential at the point where the GOR trendline reaches the GOR cutoff threshold (e.g., where the bubble point is declared achieved).

In various embodiments, the GOR trend may be linear. In various embodiments, the GOR trend may be linear on a semi-logarithmic plot. In some embodiments, the GOR trend may instead be non-linear. For example, the GOR trend may have a curved shape corresponding to a non-linear function. In some examples, the GOR trend may be a piecewise defined function with different trends for different time periods.

In some examples, the order of the steps in the GOR trend method 500 might be altered. For example, the step 525 may occur before the fourth (decision) step 520 and after the third step 515. In some embodiments, the steps 525 and 530 may use a more general function (than an Arps function) to fit the oil/gas data. In some examples, the functions may be a first and second characteristic functions with properties described above. For example, the functions may be any type of decline curve known in the art of decline curve analysis.

In some examples, the functions may be polynomial functions. Polynomial functions may have the benefit of being any order and easily differentiable. A polynomial function of a high enough order may be sufficient to fit the data without being unduly computationally intensive.

In some embodiments, the functions may be linear. A linear function may adequately capture the trend in the data while being computationally efficient to fit large amounts of data.

In some examples, the functions may be non-linear. A non-linear function may capture unique aspects of the data that would be difficult to capture in a linear or polynomial function. Non-linear functions may be appropriate for a wide variety of cases where the data exhibits non-linear behavior.

Figure 6:
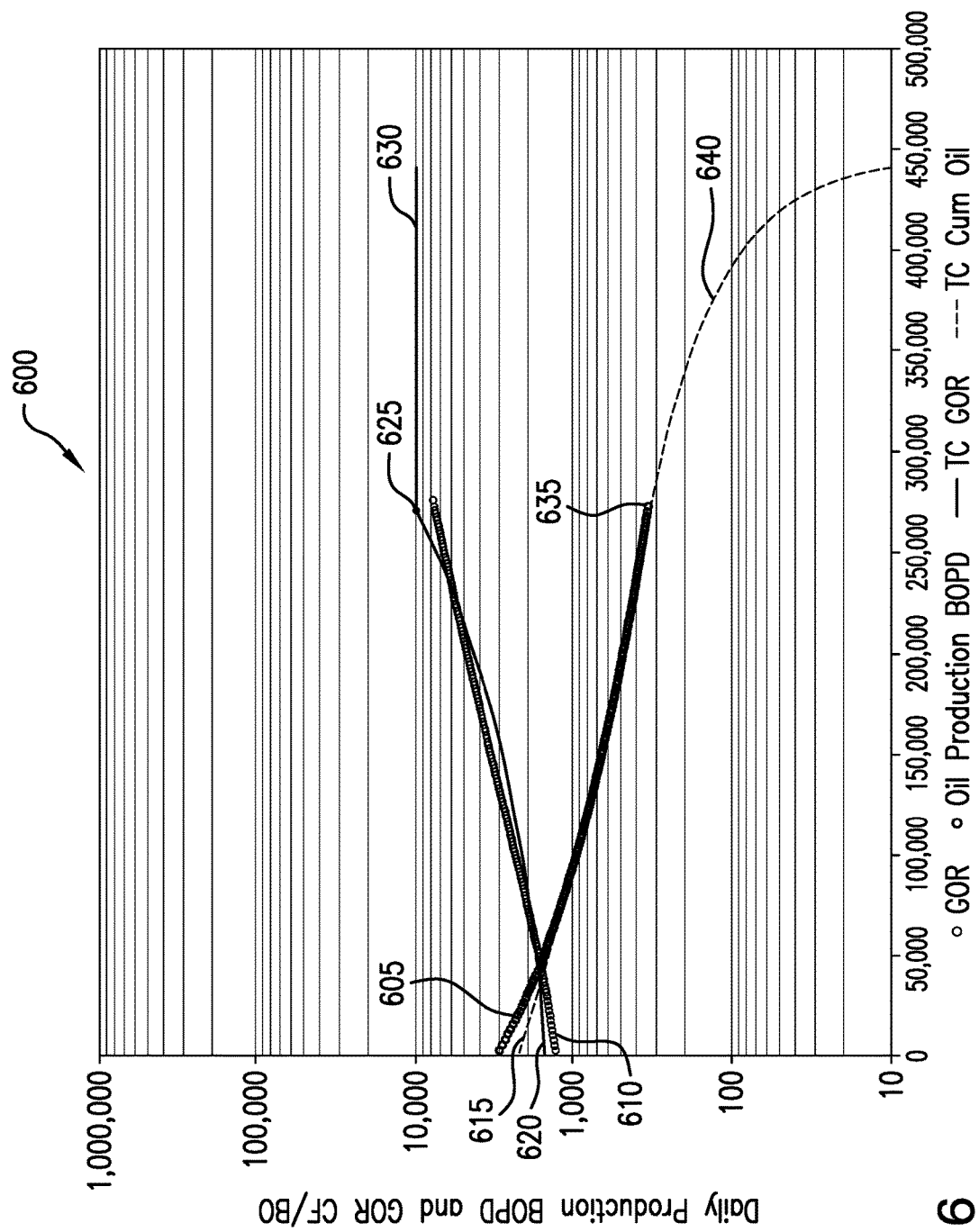
FIG. 6 depicts a graph of exemplary empirical oil production and GOR data illustrating exemplary curves fitted to the data, where the fitted oil production curve transitions from a first characteristic function to a second characteristic function near the bubble point.

FIG. 6 depicts a graph of exemplary empirical oil production and GOR data illustrating exemplary curves fitted to the data, where the fitted oil production curve transitions from a first characteristic function to a second characteristic function near the bubble point. An oil production and GOR vs. cumulative oil graph 600 is shown with both empirical oil production data 605 and empirical GOR data 610. In contrast to the empirical data shown in FIG. 4, the empirical data in FIG. 6 has not yet reached its bubble point. Each set of data has its own corresponding fitted curve (an oil production fitted curve 615 and a GOR fitted curve 620). The phrase "TC" in FIG. 6 refers to a "type curve" (another way of saying fitted curve).

In applying the particular method described in FIG. 5 to the data in FIG. 6, early time production data is first used to determine a rate of increase of the GOR in a producing well. On a linear x plot and a logarithmic y plot of oil rate, gas rate and/or GOR data, the GOR data 610 displays a gradual linear increase. The rate of increase in the GOR is noted and the observed rate may be projected into the future using the GOR fitted curve 620, with a cutoff, such as, for example, in the range of 10,000 to 100,000 scf/STB. It is at this cutoff that the bubble point is declared to be achieved.

In some exemplary embodiments, a pre-determined bubble point threshold may be established for the GOR at which the bubble point is declared achieved. This may be any number from the initial GOR up to infinity (e.g., 20,000 standard cubic feet per barrel of oil (scf/STB)). In the exemplary embodiment of FIG. 6, the pre-determined bubble point threshold was set to 10,000 scf/STB. At the pre-determined bubble point threshold of 10,000 scf/STB, the GOR fitted curve 620 reaches a GOR transition point 625 where the GOR fitted curve becomes a flat line 630 (holding steady at pre-determined bubble point threshold of 10,000 scf/STB). The GOR transition point 625 also corresponds to an oil production transition point 635 at which the oil production fitted curve 615 transitions from a first characteristic function (the first portion of the oil production fitted curve 615) to a second characteristic function (the second portion of the oil production fitted curve 615).

An explanation of this process for a transition from an Arps hyperbolic function to an Arps exponential function is described as follows: after the bubble point has been determined, an Arps hyperbolic function is fit to the oil data, allowing an initial forecast to be determined. The gas rate is forecast on top of the oil forecast by applying the rate of GOR increase to the forecasted oil production. Once the pre-determined bubble point is reached in the GOR forecast, the instantaneous period hyperbolic decline rate is determined via a look up table, which then becomes the terminal exponential decline rate.

In some examples, the bubble point may be determined using other methods. For example, the bubble point may be set as the point on the barrels of oil equivalent (BOE) curve where the rate of change of the BOE curve reaches zero (e.g., the first derivative changes from negative to positive). In an exemplary embodiment, the bubble point is set as the point on the BOE curve near where the slope of the BOE curve starts to climb from a zero to a positive value (such that the total produced energy equivalence of the well never increases). Such an exemplary method is illustrated in FIG. 7 and described below.

Figure 7:
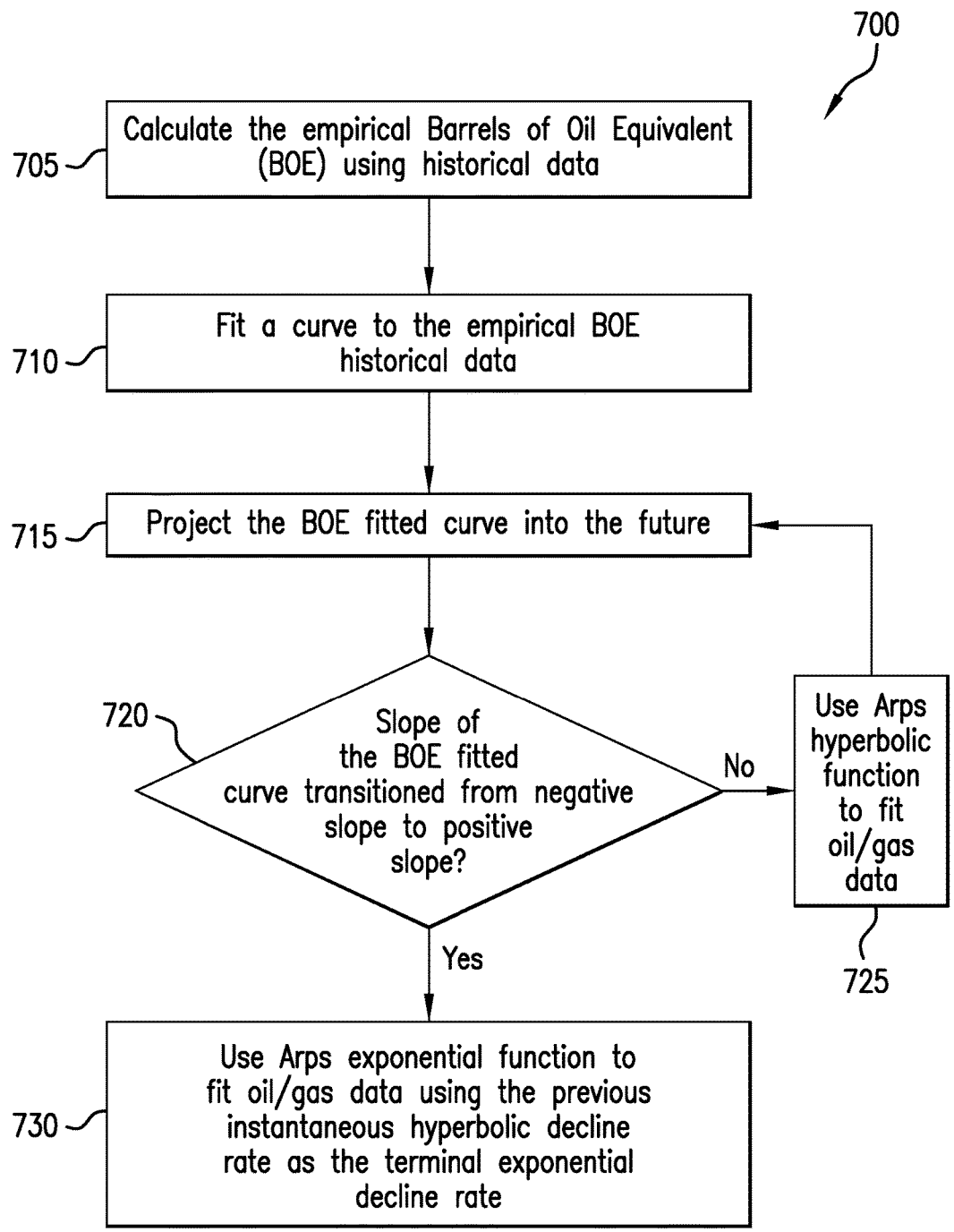
FIG. 7 depicts a flow chart illustrating an exemplary use of a barrels of oil equivalent (BOE) fitted curve to determine the moment of occurrence of a bubble point.

FIG. 7 depicts a flow chart illustrating exemplary use of a barrels of oil equivalent (BOE) fitted curve to determine the moment of occurrence of a bubble point. A BOE fitted curve method 700 for determining the bubble point begins with a first step 705 of calculating the empirical BOE over time using historical data. In a second step 710, a curve is fitted to the empirical BOE historical data. In a third step 715, the BOE fitted curve determined in the previous step is projected into the future.

In a fourth (decision) step 720, the slope of the BOE fitted curve is determined at the point in the future corresponding to the third step 715. The slope of the BOE fitted curve at this future time is evaluated to see whether the slope has transitioned from a negative slope to a positive slope. If this slope transition has not yet occurred, then a hyperbolic Arps function is used to fit oil and/or gas data 725, and the BOE fitted curve continues to be projected into the future (back to the third step 715). If, after projecting the BOE fitted curve into the future, the slope of the BOE fitted curve has transitioned from a negative slope to a positive slope, then an exponential Arps function is used to fit oil and/or gas data 730 using the previous hyperbolic Arps decline rate as the terminal exponential Arps decline rate. In this sense, the curve fitted to the oil and/or gas data switches from hyperbolic to exponential at the point where the slope of the BOE fitted curve transitions from a negative (through zero) to a positive slope (e.g., where the bubble point is declared achieved).

In some examples, the order of the steps in the BOE fitted curve method 700 might be altered. For example, the step 725 may occur before the fourth (decision) step 720 and after the third step 715. In some embodiments, the steps 725 and 730 may use a more general function (than an Arps function) to fit the oil/gas data. In some examples, the functions may be a first and second characteristic functions with properties described above. For example, the functions may be any type of decline curve known in the art of decline curve analysis. In some examples, the functions may be polynomial functions. In some embodiments, the functions may be linear. In some examples, the functions may be non-linear.

Figure 8:
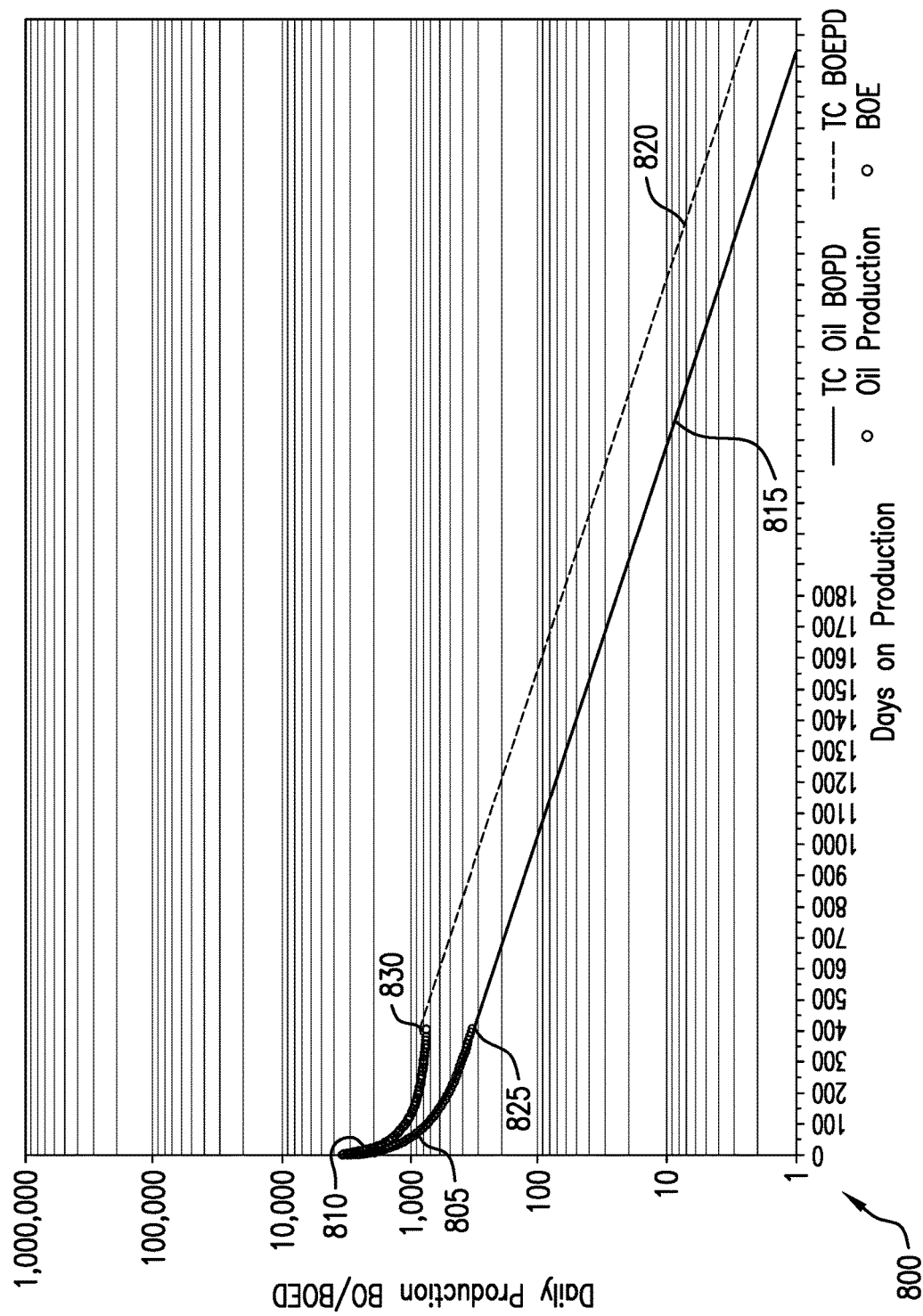
FIG. 8 depicts a graph of exemplary empirical oil production and BOE production data illustrating exemplary curves fitted to the data, where the fitted oil production curve transitions from hyperbolic to exponential near the bubble point.

FIG. 8 depicts a graph of exemplary empirical oil production and BOE production data illustrating exemplary curves fitted to the data, where the fitted oil production curve transitions from hyperbolic to exponential near the bubble point. An oil production and BOE vs. time graph 800 is shown with both empirical oil production data 805 and empirical BOE data 810. Each set of data has its own corresponding fitted curve (oil production fitted curve 815 and BOE fitted curve 820).

At around day 400 (on the time axis), the empirical BOE data 810 exhibits a rate of change near zero. At around the same time, the corresponding BOE fitted curve 820 exhibits a slope that is starting to transition from negative (through zero) to positive. According to the method described in FIG. 7, it is at a BOE transition point 830 where the bubble point is declared achieved. Using the BOE transition point 830 as the bubble point, the current method uses this same time as an oil production transition point 825 where the oil production fitted curve 815 transitions from an Arps hyperbolic function to an Arps exponential function (as described in FIG. 7).

In some implementations, the bubble point may be determined by calculating the "total recoverable oil at bubble point" (as described below), where the bubble point may be predicted at some specific time in the future. This may involve utilization of methods for determining the hydrocarbon pore volume (HCPV) of a subterranean reservoir. This method of calculating the "total recoverable oil at bubble point" is may be referred to as the "Predictive Material Balance and Recovery Factor Method for Future Bubble Point Determination."

Petrophysical and geological sciences have established a variety of methods for determining the hydrocarbon pore volume (HCPV) of a subterranean reservoir. Likewise, the petroleum reservoir engineering discipline has established various methods for direct and indirect determination of hydrocarbon fluid properties. With the two key insights that: (1) shale oil reservoir production is driven in its largest part by expansion of the oil phase until the bubble point, and (2) reaching the bubble point marks a dramatic change in the oil decline response once reached, knowledge of HCPV from geological/petrophysical methods and fluid properties from engineering methods can be used to proactively determine the number of barrels of oil that should be recoverable due to this limited primary drive mechanism.

By exploiting the observation that the primary drive mechanism is oil expansion, various implementations may modify traditional workflow to provide an improved method of determining at which barrel of production the bubble point will be reached. In this sense, the recoverable oil from primary drive may be used as a bound for bubble point threshold determination. With knowledge of HCPV and fluid properties, the present method may make it possible to determine the total amount of recoverable oil from a drilling unit and for each well placed in a drilling unit. From these data, the present method may estimate an individual well's "bubble point barrel" (where the hyperbolic/exponential transition occurs) without having to utilize a GOR trend.

Figure 9:
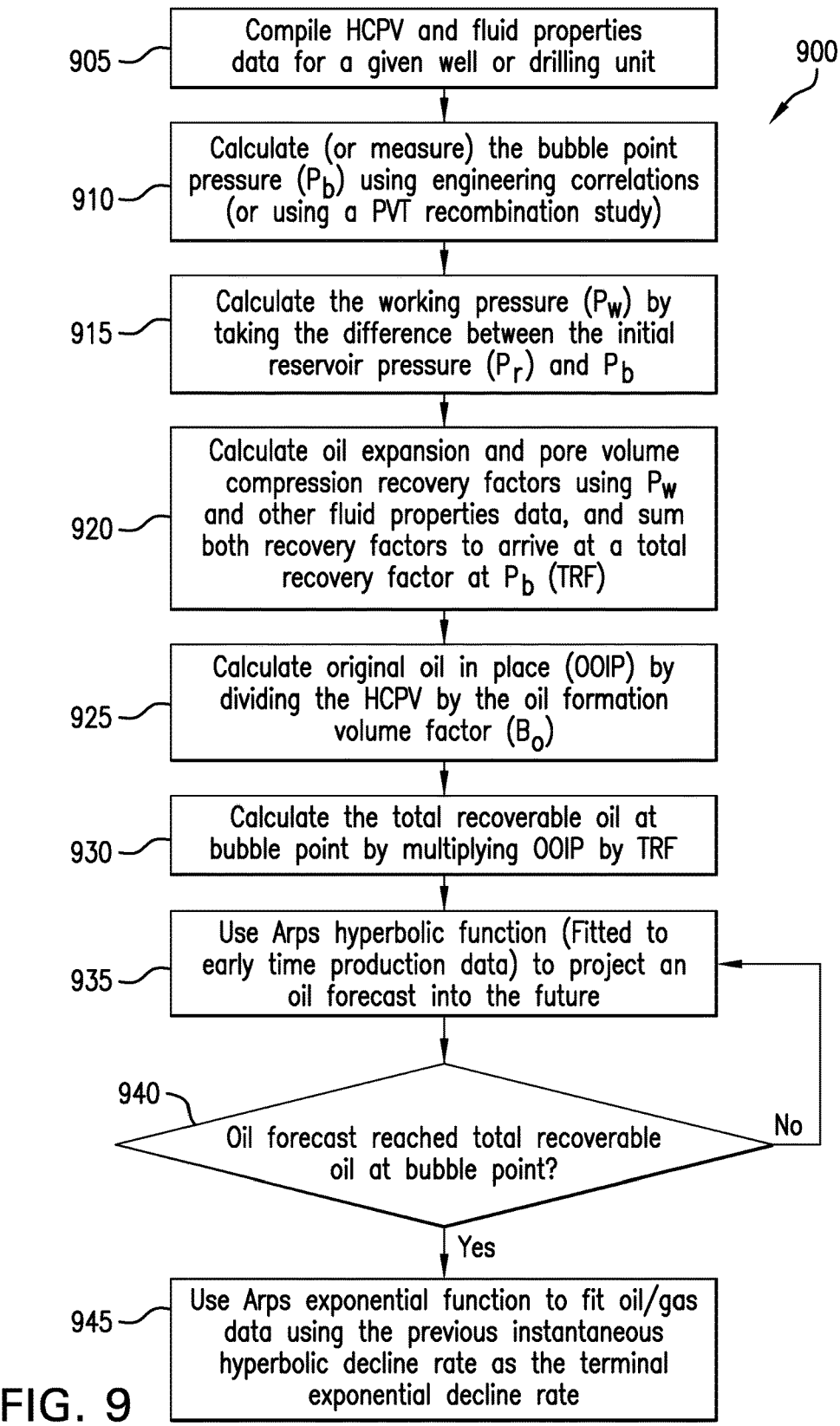
FIG. 9 depicts a flow chart illustrating exemplary use of a predictive material balance method to determine the moment of occurrence of a bubble point.

FIG. 9 depicts a flow chart illustrating exemplary use of a predictive material balance method to determine the moment of occurrence of a bubble point. A Predictive Material Balance and Recovery Factor Method for Future Bubble Point Determination 900 possesses several steps followed to predict the future occurrence of a bubble point. In a first step 905, data for HCPV and fluid properties is compiled for a given well or drilling unit. This data may include variables such as: HCPV, initial GOR, initial American Petroleum Institute gravity (API gravity), initial gas gravity ($S_g$), initial reservoir temperature (T), and initial reservoir pressure ($P_r$). HCPV may be in units of rBbls/640ac.

In a second step 910, any variety of Reservoir Fluid Petroleum Engineering correlations (or direct lab measurement of PVT behavior) are used to calculate the bubble point pressure (Pb). In some exemplary embodiments, an engineering correlation to determine the bubble point pressure may have the form of:

$$pb=(Rsb/(C1*Gamma\_g*exp(C3*Gamma\_API/(Tr+460))))**(1/C2), \text{ where}$$

pb=bubble point pressure, psia [50,5250]
Rsb=solution GOR at pb, scf/STB, [20,2070]
Gamma_g=gas gravity (air=1.0), [0.56,1.18]
Tr=reservoir temperature, F, [70,295] and
Gamma_API=stock-tank oil gravity, API [16,58].
C1, C2 and C3 are constants, depending on API.

In a third step 915, the working pressure ($P_w$) is calculated by subtracting the bubble point pressure from the initial reservoir pressure. In a fourth step 920, both the (1) oil expansion recovery factor, and (2) pore volume compression recovery factor are calculated using the working pressure and other fluid properties data. Both recovery factors (1) and (2) are then summed to arrive at a total recover factor (TRF) at the bubble point. In a fifth step 925, the original oil in place (OOIP) is calculated by dividing the HCPV by the oil formation volume factor (Bo). The total recoverable oil at bubble point is then calculated in a sixth step 930 by multiplying the original oil in place by the total recovery factor at bubble point. In a seventh step 935, an Arps hyperbolic function is fitted to early time production data, which is used to project an oil forecast into the future.

In an eighth (decision) step 940, the forecast created in the seventh step 935 is compared to the total recoverable oil at bubble point calculated in the sixth step 930. If the forecast has not yet reached the total recoverable oil at bubble point, then the Arps hyperbolic function used in the seventh step 935 continues to be projected into the future. If instead, the forecast has reached the total recoverable oil at bubble point, then an Arps exponential function is used to fit the oil/gas data in a ninth step 945. In this ninth step 945, the previous instantaneous hyperbolic decline rate is used as the terminal exponential decline rate. In this sense, the curve fitted to the oil and/or gas data switches from hyperbolic to exponential at the point where the Arps hyperbolic forecast (used in the seventh step 935) reaches the total recoverable oil at bubble point (e.g., where the bubble point is declared achieved).

In some examples, the order of the steps in the Predictive Material Balance and Recovery Factor Method for Future Bubble Point Determination 900 might be slightly altered. In some embodiments, the steps 935 and 945 may use a more general function (than an Arps function) to fit the oil/gas data. In some examples, the functions may be a first and second characteristic functions with properties described above. For example, the functions may be any type of decline curve known in the art of decline curve analysis. In some examples, the functions may be polynomial functions. In some embodiments, the functions may be linear. In some examples, the functions may be non-linear.

Figure 10:
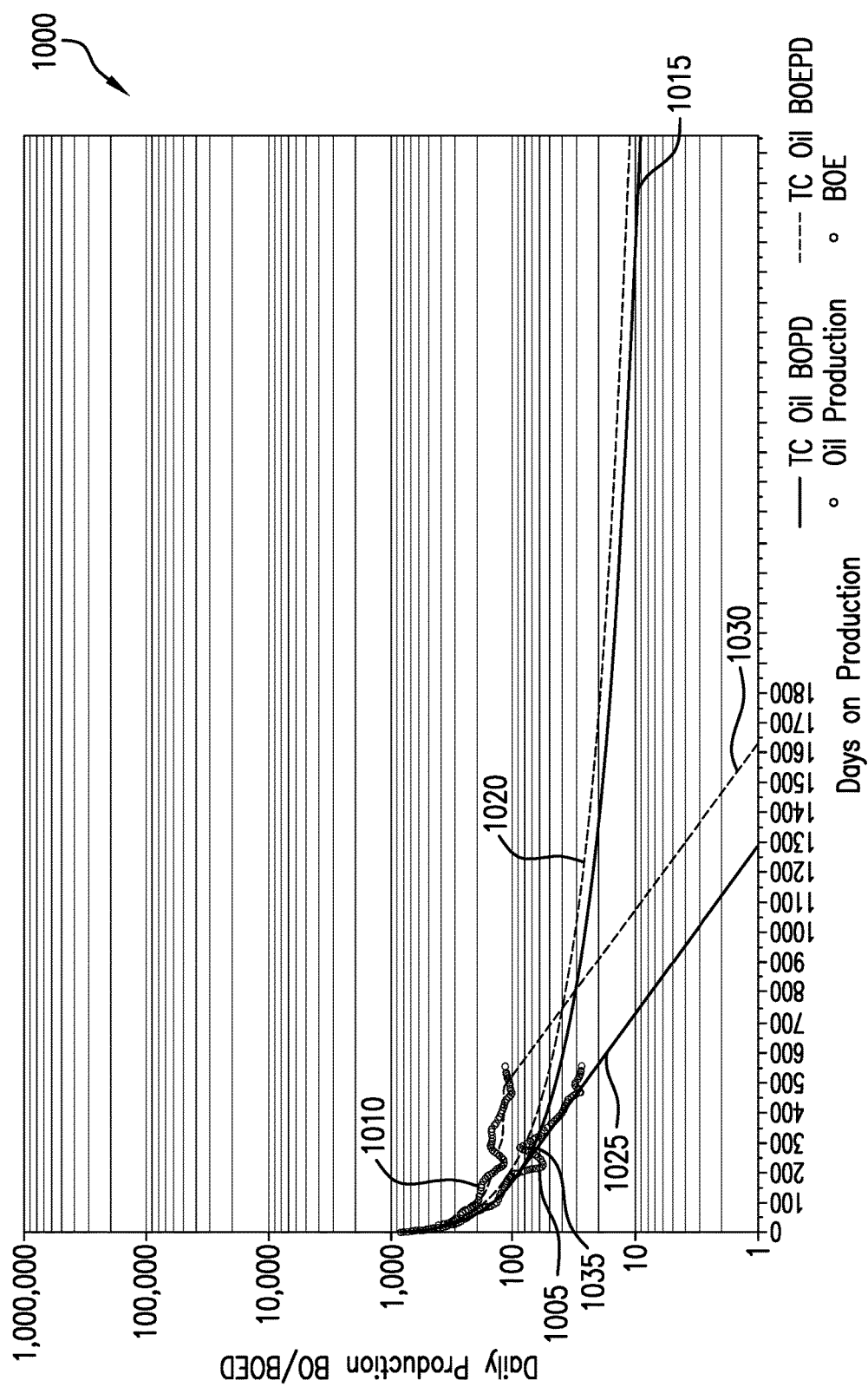
FIG. 10 depicts a graph of exemplary empirical data illustrating the occurrence of a bubble point with an exemplary typical Arps curve compared to an exemplary piecewise defined Arps curve that transitions from hyperbolic to exponential near the bubble point.

FIG. 10 depicts a graph of exemplary empirical data illustrating the occurrence of a bubble point with an exemplary typical Arps curve compared to an exemplary piecewise defined Arps curve that transitions from hyperbolic to exponential near the bubble point. The empirical data included on a daily production graph 1000 includes oil production data 1005 and barrel of oil equivalent (BOE) data 1010 over time. Traditional Arps hyperbolic functions fitted to both the oil and BOE data are shown as a typical oil curve 1015 and a typical BOE curve 1020. These typical curves 1015 and 1020 are contrasted with a piecewise defined oil curve 1025 and a piecewise defined BOE curve 1030. Both of the piecewise defined curves 1025 and 1030 may possess an effective decline rate, the absolute value of which is at all times past the bubble point greater than the absolute value of the effective decline rates of the typical curves 1015 and 1020. Furthermore, both of the piecewise defined curves 1025 and 1030 exhibit a stepper drop off in oil and BOE production after a bubble point 1035 is reached. In this sense, the piecewise defined curves 1025 and 1030 predict significantly less oil/gas/BOE production over the life of the well (or drilling unit) versus the typical curves 1015 and 1020. In the illustrative example depicted in FIG. 10, traditional methods may predict a total cumulative production of oil to be 148,105 barrels of oil at the economic limit (typical oil curve 1015) while the new method disclosed herein would incorporate a prediction of 60,184 barrels of oil at the economic limit (the piecewise defined oil curve 1025), with reality more closely reflecting the latter rather than the former.

Figure 11:
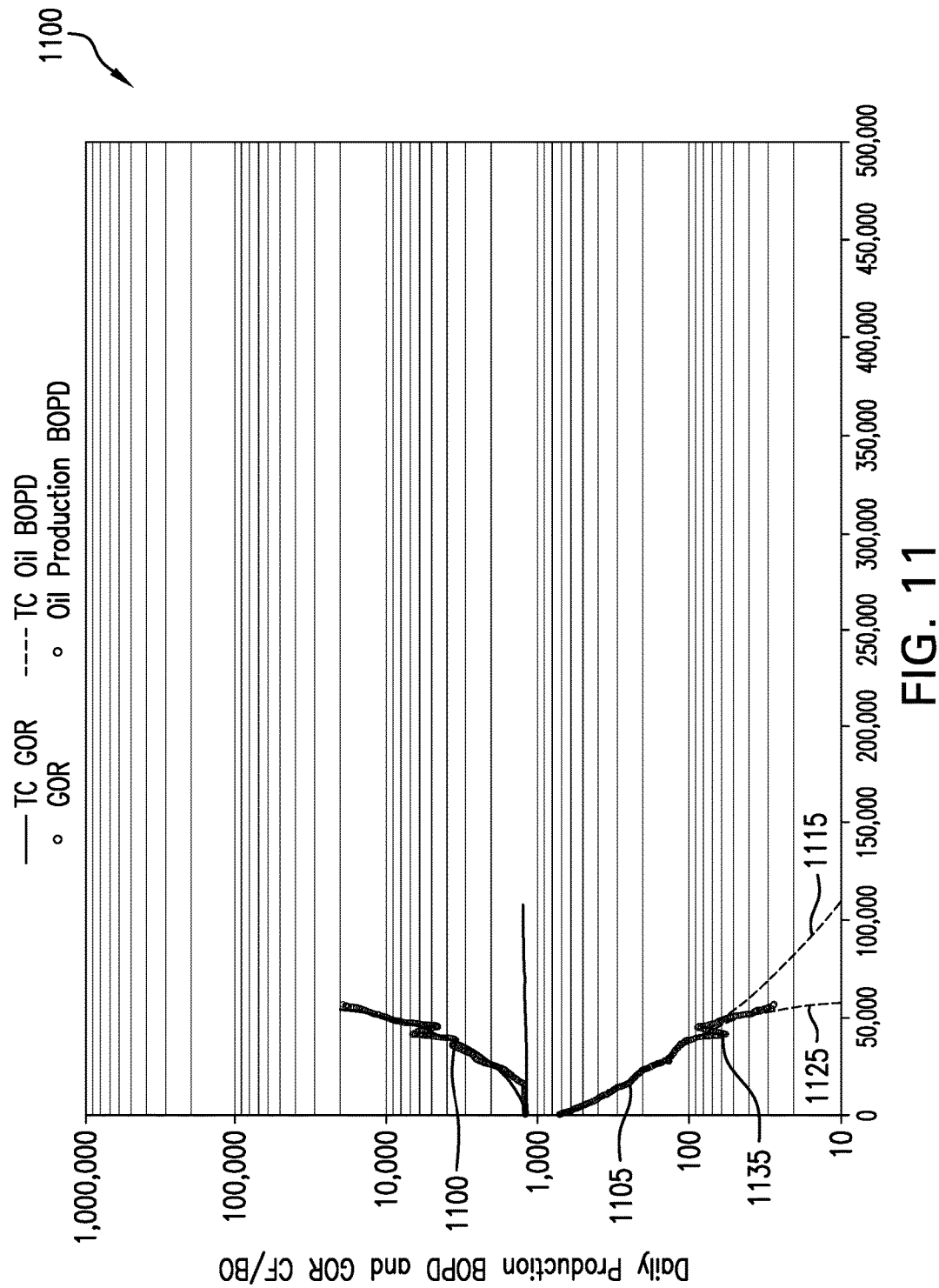
FIG. 11 depicts a graph of exemplary empirical data illustrating the occurrence of a bubble point with an exemplary typical Arps curve compared to an exemplary piecewise defined Arps curve that transitions from hyperbolic to exponential near the bubble point.

FIG. 11 depicts a graph of exemplary empirical data illustrating the occurrence of a bubble point with an exemplary typical Arps curve compared to an exemplary piecewise defined Arps curve that transitions from hyperbolic to exponential near the bubble point. The empirical data included on the cumulative oil production graph 1100 includes oil production data 1105 and GOR data 1110 as a function of cumulative oil production.

A traditional Arps hyperbolic function is fitted to oil data, shown as a typical oil curve 1115. This typical oil curve 1115 is contrasted with a piecewise defined oil curve 1125. The piecewise defined oil curve 1125 can be seen as possessing effective decline rate, the absolute value of which is at all times past the bubble point greater than the absolute value of the effective decline rates of the typical oil curve 1115. Furthermore, the piecewise defined oil curves 1125 exhibit a stepper drop off in oil production after a bubble point 1135 is reached. In this sense, the piecewise defined oil curve 1125 predicts significantly less oil/gas/BOE production over the life of the well (or drilling unit) versus the typical oil curves 1115.

Figure 12:
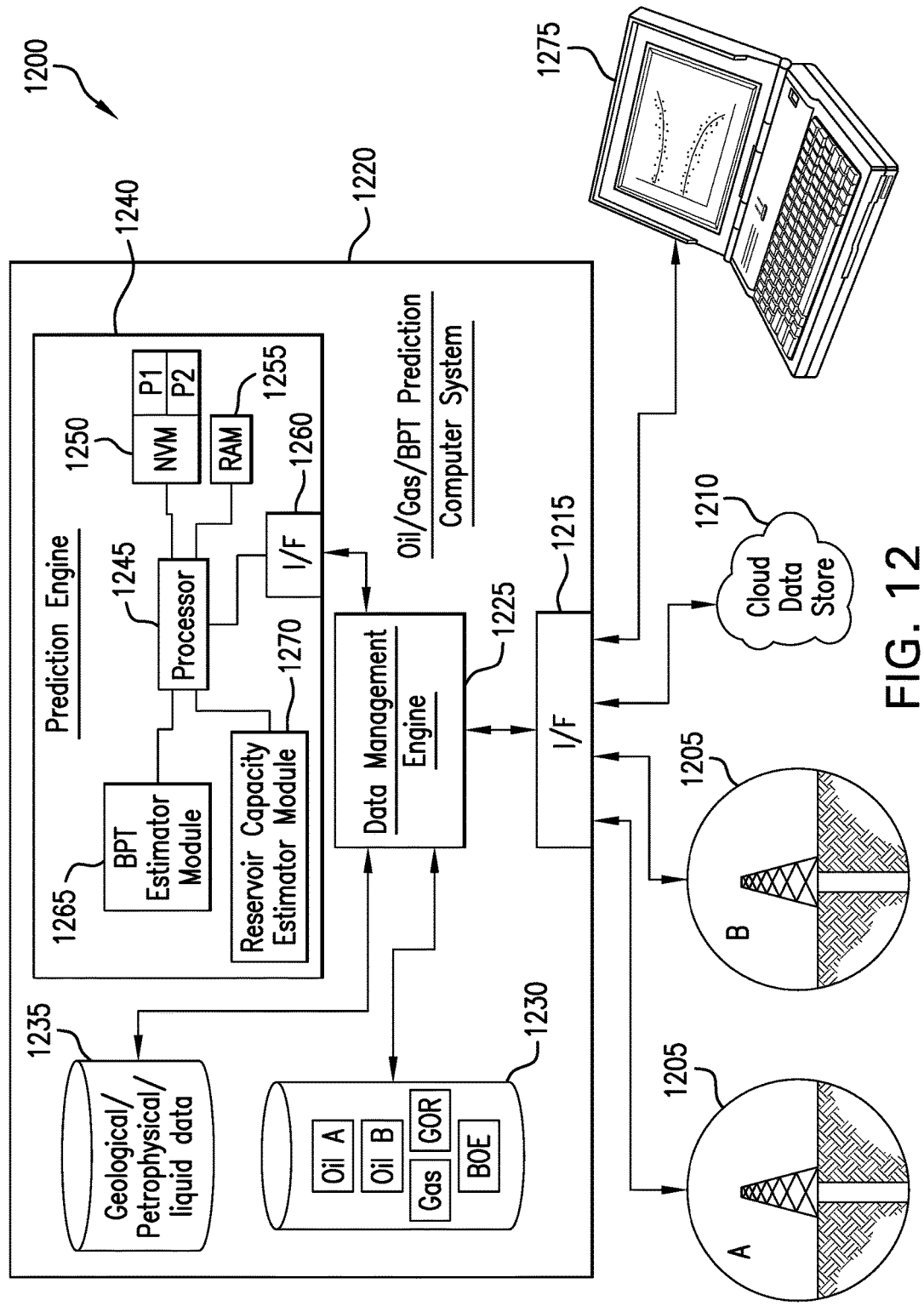
FIG. 12 depicts a diagram of an exemplary oil, gas, and bubble point prediction computer system.

FIG. 12 depicts a diagram of an exemplary oil, gas, and bubble point prediction computer system. A prediction system 1200 uses oil, liquids, and gas production data from a producing wellbore using any method. The data used by the prediction system 1200 may come directly from sensors or monitors at wells 1205. The data used by the prediction system 1200 may also come from a cloud data storage 1210, which may have a compilation of data pertaining to oil, liquids, and gas production. The data from the wells 1205 and cloud data storage 1210 is transmitted to an interface 1215 of an oil/gas/bubble point computer prediction system 1220.

The interface 1215 communicates data and information to and from a data management engine 1225, which controls the flow of data and information within the oil/gas/bubble point computer prediction system 1220. The data management engine 1225 is configured to send data to, and receive data from, an oil and gas database 1230, a geological/petrophysical/liquid database 1235, and a prediction engine 1240. The oil and gas database 1230 stores historical and/or real-time data about oil and gas production from, for example, oil wells 1205. The geological/petrophysical/liquid database 1235 contains data relating to various geological/petrophysical/liquid variables, including, but not limited to, HCPV, initial GOR, API gravity, initial gas gravity, initial reservoir temperature, and initial reservoir pressure. The prediction engine 1240 uses the data in the databases to make predictions and forecasts for bubble point thresholds and oil and gas production.

The prediction engine 1240 includes at least a processor 1245, a non-volatile memory 1250, a random-access memory 1255, and an interface 1260. The interface 1260 transmits data to, and receives data from, the data management engine 1225. The interface 1260 communicates with the processor 1245, which executes various pre-programmed sets of instructions stored in the nonvolatile memory 1250 (e.g., P1 and P2) and employs the random-access memory 1255. The programs stored in the nonvolatile memory 1250 may include pre-programmed implementations of the methods described within this disclosure (such as the methods 500, 700, 900, and 1300 in FIGS. 5, 7, 9, and 13), and may also include a set of pre-programmed instructions for rendering and displaying various analytical tools (such as, for example, graphs, charts, statistical summaries, and data visualizations). The prediction engine may also include specialized modules, such as a bubble point estimator module 1265 and a reservoir capacity estimator module 1270 (which may instead be stored as a set of pre-programmed instructions in nonvolatile memory 1250). The bubble point estimator module 1265 may be configured to implement the various bubble point estimation methods described in FIGS. 5 and 7. The reservoir capacity estimator module 1270 may be configured to implement the "predictive material balance" method described in FIG. 9.

When the processor 1245 executes the set of pre-programmed instructions stored in nonvolatile memory 1250 (and the set of pre-programmed instructions in the modules 1265 and 1270), it communicates this information to the interface 1260, which relays the information back to the data management engine 1225. The interface 1215 then takes this information relayed to the data management engine 1225, and communicates it to a user interface 1275. The user interface 1275 can display the various analytical tools to a user. The user interface 1275 can also receive input from a user, which can be translated into instructions for the processor 1245 to implement (by sending it through the interfaces 1215 and 1260).

Figure 13:
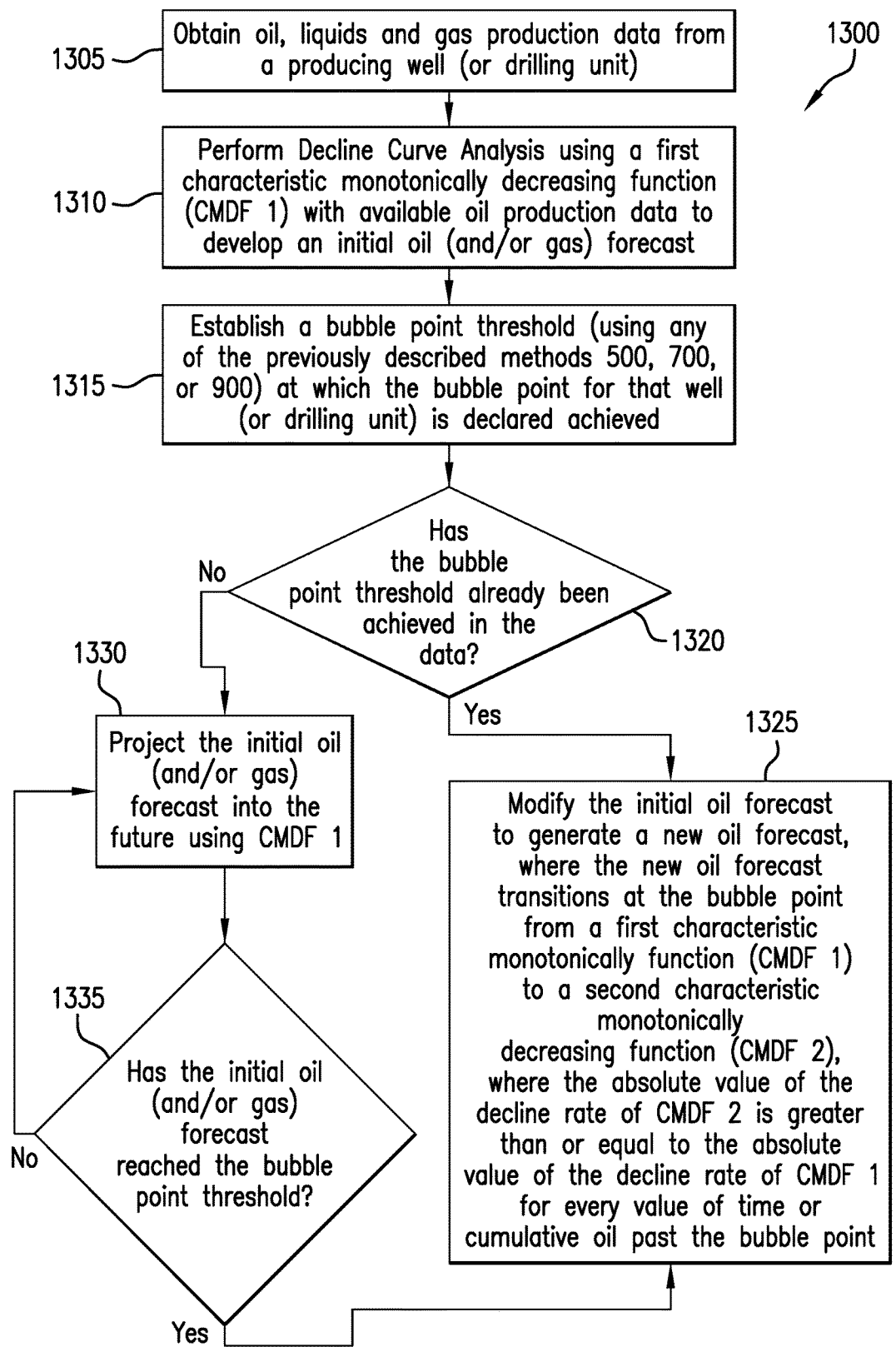
FIG. 13 depicts a flow chart describing an exemplary generalized method for oil and/or gas forecasting using a fitted curve that transitions from a first characteristic function to a second characteristic function near the bubble point.

FIG. 13 depicts a flow chart describing an exemplary generalized method for oil and/or gas forecasting using a fitted curve that transitions from a first characteristic function to a second characteristic function near the bubble point. A generalized method 1300 begins with a first step 1305 of obtaining oil, liquids, and gas production data from a given well or drilling unit. In a second step 1310, a decline curve analysis is performed using a first characteristic monotonically decreasing function (CMDF 1) using the data obtained in the first step 1305 to develop an initial oil and/or gas forecast. In a third step 1315, a bubble point threshold is established using any of the previously described methods (e.g., the methods 500, 700, and 900 in FIGS. 5, 7, and 9).

In a fourth (decision) step 1320, the data from the first step 1305 is compared to the bubble point threshold established in the third step 1315 to determine whether the bubble point threshold has already been achieved in the data. If it has, then a new oil and/or gas forecast is generated in a final step 1325, where the forecast transitions at the bubble point from a CMDF 1 to a second characteristic monotonically decreasing function (CMDF 2), where the primary distinguishing attribute between CMDF 1 and CMDF 2 is that the absolute value of the decline rate of CMDF 2 is greater than or equal to the absolute value of the decline rate of CMDF 1 for every value of time (or cumulative oil) past the bubble point. If the bubble point threshold has instead not already been achieved in the data, then the initial oil and/or gas forecast (CMDF 1) from the second step 1310 is projected into the future in a fifth step 1330. In a sixth (decision) step 1335, the initial oil and/or gas forecast (CMDF 1) is checked to see if it has reached the bubble point threshold (established in the third step 1315). If it has not, then the method continues to project the initial oil and/or gas forecast into the future using CMDF 1 (back to the fifth step 1330). If instead, the initial oil and/or gas forecast (CMDF 1) has reached the bubble point threshold, then the method goes to the final step 1325 previously described above.

Figure 14:
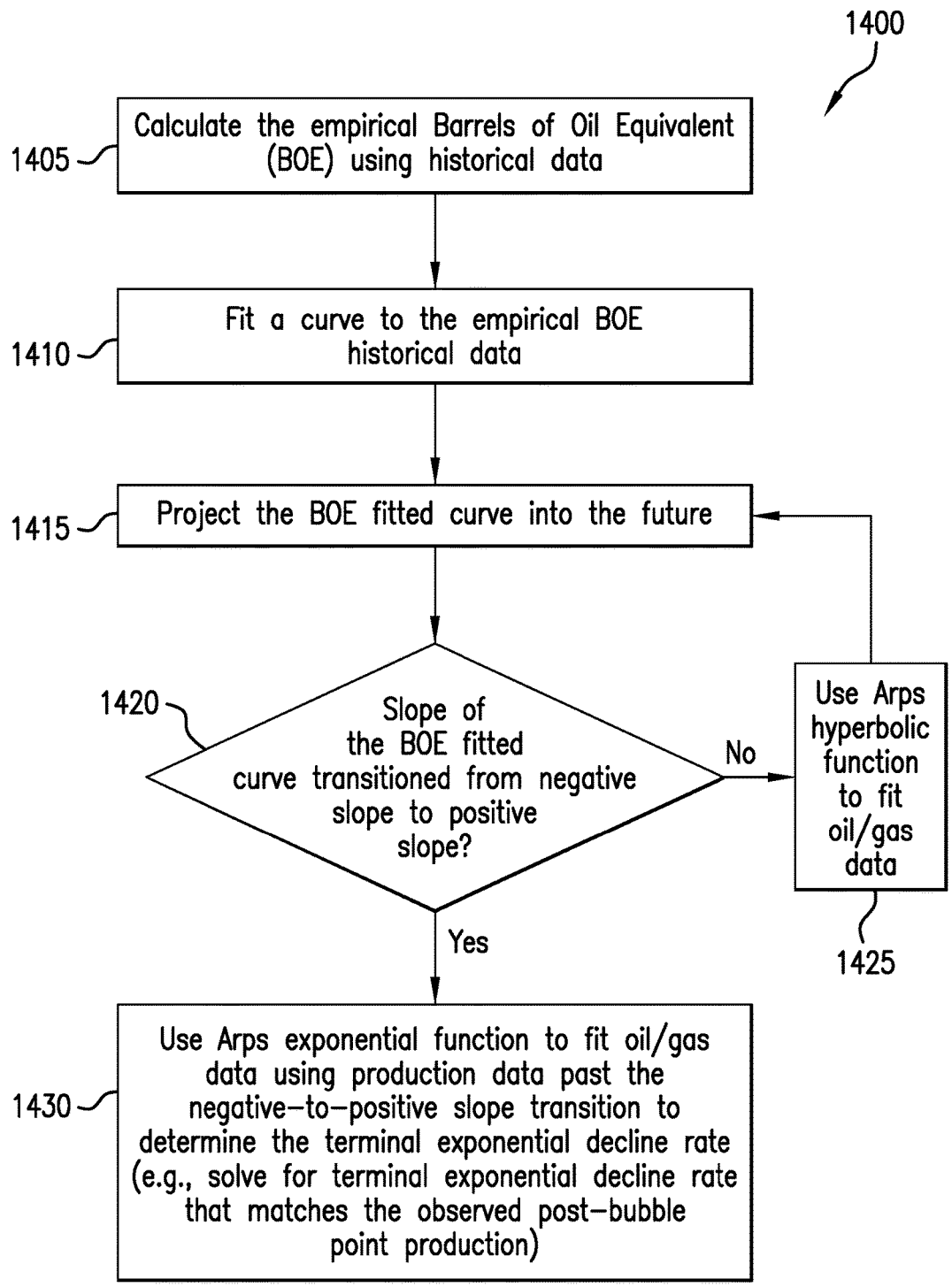
FIG. 14 depicts a flow chart illustrating an exemplary use of a barrels of oil equivalent (BOE) fitted curve to determine the moment of occurrence of a bubble point and to derive a terminal exponential decline rate using post-bubble point data.

FIG. 14 depicts a flow chart illustrating an exemplary use of a barrels of oil equivalent (BOE) fitted curve to determine the moment of occurrence of a bubble point and to determine a terminal exponential decline rate using post-bubble point data. A BOE fitted curve method 1400 for determining the bubble point includes steps 1405, 1410, 1415, 1420, and 1425 that mirror the steps 705, 710, 715, 720, and 725 shown in FIG. 7. The steps shown in FIG. 7 may be used when there is a lack of production data post-bubble point. In contrast, the steps shown in FIG. 14 may be used when there is production data post-bubble point.

For example, if at step 1420, the slope of the BOE fitted curve transitions from negative to positive slope, and there exists production data occurring after this transition, then method 1400 may be used instead of method 700. In such a case, at step 1430, an Arps exponential function is used to fit the oil/gas data post-bubble point, with the terminal exponential decline rate of that Arps exponential function being determined from post-bubble point production data. In some examples, this terminal exponential decline rate may be determined by separately fitting the Arps exponential function to the post-bubble point data. The Arps exponential function may further be constrained by requiring that the Arps exponential function (post-bubble point) is continuous with the Arps hyperbolic function (pre-bubble point). Any type of fitting method (e.g., least-squares regression) may be used to determine the terminal exponential decline rate that matches the observed post-bubble point production.

Step 1430 is contrasted with step 730, which uses the previous instantaneous hyperbolic decline rate as the terminal exponential decline rate, whereas step 1430 determines the terminal exponential decline rate from post-bubble point data. Step 1430 may give a more realistic production projection, as the data occurring after the bubble point may be leveraged to produce a more accurate terminal exponential decline rate. Accordingly, where production data exists after the slope of the BOE fitted curve transitions from negative to positive slope (e.g., the identified/declared bubble point), step 1430 may be used instead of step 730. Put another way, method 1400 may use the production data post-bubble point (if it exists) to solve for the terminal exponential decline rate that results in the empirical production data post-bubble point.

In some examples, the order of the steps in the BOE fitted curve method 1400 may be altered. For example, the step 1425 may occur before the fourth (decision) step 1420 and after the third step 1415. In some embodiments, the steps 1425 and 1430 may use a more general function (than an Arps function) to fit the oil/gas data. In some examples, the functions may be a first and second characteristic functions with properties described above. For example, the functions may be any type of decline curve known in the art of decline curve analysis. In some examples, the functions may be polynomial functions. In some embodiments, the functions may be linear. In some examples, the functions may be non-linear.

Figure 15:
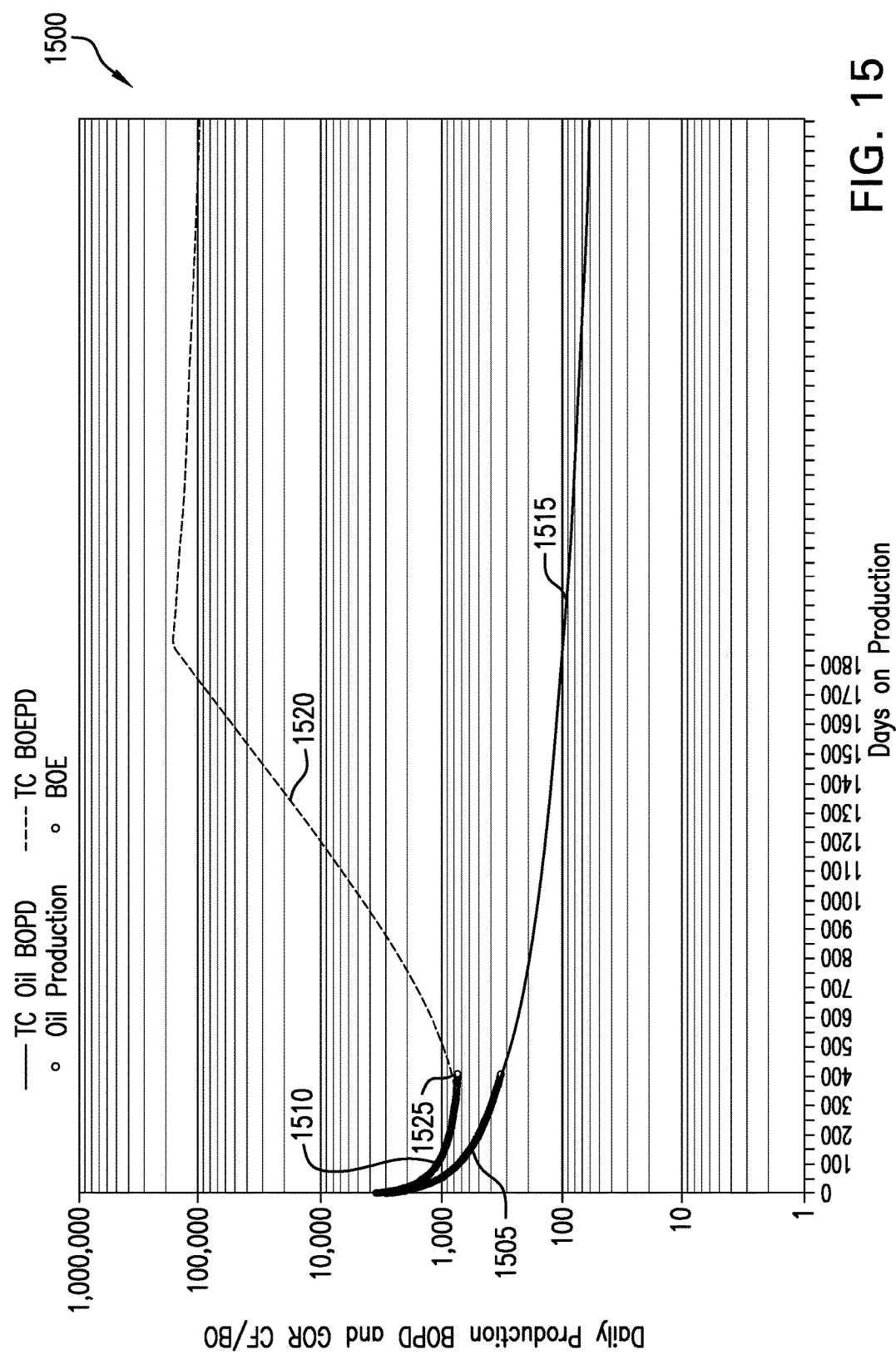
FIG. 15 depicts a graph of exemplary empirical oil production and BOE production data illustrating exemplary curves fitted to the data, where the fitted BOE production curve exhibits a local minimum where the slope transitions from negative to positive.

FIG. 15 depicts a graph of exemplary empirical oil production and BOE production data illustrating exemplary curves fitted to the data, where the fitted BOE production curve exhibits a local minimum where the slope transitions from negative to positive. An oil production and BOE vs. time graph 1500 is shown with both empirical oil production data 1505 and empirical BOE data 1510. The empirical oil production data 1505 corresponds to an oil production fitted curve 1515. The empirical BOE data 1510 corresponds to a BOE fitted curve 1520.

At around day 400 (on the time axis), the empirical BOE data 1510 exhibits a rate of change near zero. At around the same time, the corresponding BOE fitted curve 1520 exhibits a slope at point 1525 that is starting to transition from negative (through zero) to positive. This illustrative example shows how an unaltered BOE fitted curve 1520 starts climbing after it reaches a relative minimum around day 400. Such a hypothetical curve may be considered to violate the law of conservation of energy, and may therefore be unrealistic in predicting future oil/gas/BOE production. Accordingly, the method described in FIG. 14 (and FIG. 7) would declare the BOE transition point 1525 as the time where the bubble point is declared achieved. It is at this point 1525 that the method described in FIG. 14 (and FIG. 7) would transition the fitted curves from an Arps hyperbolic function to an Arps exponential function, thus avoiding the unrealistic increasing BOE fitted curve 1520 shown in FIG. 15. Using the BOE transition point 1525 as the bubble point, the method of FIG. 14 (and FIG. 7) would use this same time as an oil production transition point where the oil production fitted curve 1515 would transition from an Arps hyperbolic function to an Arps exponential function.

Figure 16:
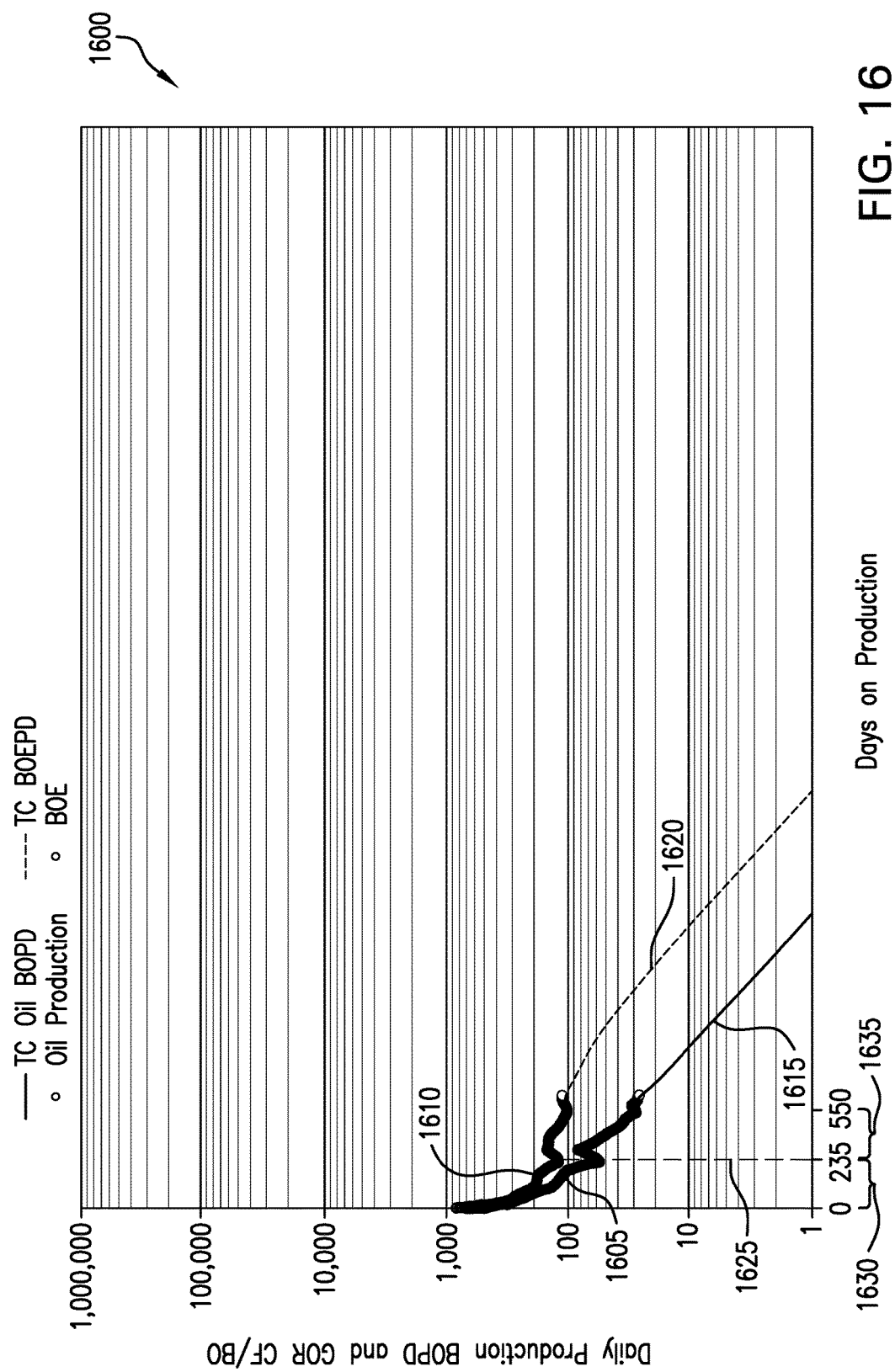
FIG. 16 depicts a graph of exemplary empirical oil production and BOE production data illustrating exemplary curves fitted to the data, where the terminal exponential decline is determined using production data occurring after the bubble point.

FIG. 16 depicts a graph of exemplary empirical oil production and BOE production data illustrating exemplary curves fitted to the data, where the terminal exponential decline is determined using production data occurring after the bubble point. The empirical data included on a daily production graph 1600 includes oil production data 1605 and barrel of oil equivalent (BOE) data 1610 over time. Functions fitted to both the oil and BOE data are shown as a piecewise fitted oil curve 1615 and a piecewise fitted BOE curve 1620. The method 1400 in FIG. 14 was used to identify day 235 as the time at which the bubble point is declared achieved (bubble point occurrence 1625). The data occurring pre-bubble point includes the data within a first time frame 1630. The data occurring post-bubble point includes the data within a second time frame 1635. Per step 1430 of the method 1400, when the BOE fitted curve's slope transitions from negative to positive (at bubble point occurrence 1625), an Arps exponential function is used to fit the oil data, where the terminal exponential decline rate of the Arps exponential function is determined using data occurring post-bubble point (data within the second time frame 1635). In this sense, the method 1400 determines the terminal exponential decline rate that matches the observed/empirical production post-bubble point.

Although various embodiments have been described with reference to the Figures, other embodiments are possible. For example, instead of CMDF 1 being in the form of an Arps hyperbolic function and CMDF 2 being in the form of an Arps exponential function, CMDF 2 may also be in the form of an Arps hyperbolic function, but with different parameters (e.g., b and D1) from CMDF 1. In various embodiments, the CMDF 1 and/or 2 may have the form a Duong decline, with CMDF 1 and 2 having different Duong "fiddle factors." In some embodiments, the CMDF 1 and/or 2 may have the form of a Fetkovich decline.

In some embodiments, the forecasts may be data (other than oil and gas production data) that may have a bearing on oil and gas production. For example, a forecast might forecast GOR. In some examples, a forecast might be for the working pressure ($P_w$) of a given well.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11 a/b/g, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A method for predicting oil and gas production from an oil well may include receiving oil, liquids, and gas production data from a producing wellbore. In some embodiments, a method may perform a decline curve analysis with an Arps hyperbolic function using oil production data to develop an initial oil forecast. In some embodiments, a method may define a gas to oil ratio trend by fitting a linear function to the gas to oil ratio data for an initial period. In some embodiments, a method may apply the gas to oil ratio trend to the initial oil forecast to derive an initial gas forecast. In some embodiments, a method may establish a predetermined bubble point threshold for the gas to oil ratio at which the bubble point is declared achieved. In some embodiments, a method may lookup within a table of the initial gas forecast the value corresponding to the time at which the bubble point is declared achieved. In some embodiments, a method may determine the instantaneous hyperbolic decline rate at the time corresponding to when the bubble point is declared achieved. In some embodiments, a method may generate a new oil forecast, where a terminal decline function transitions from hyperbolic to exponential with the instantaneous hyperbolic decline rate from the previous step being substituted as the terminal exponential decline rate.

Oil reserve estimates serve a critical function in the oil and gas industry, as accuracy in their prediction is used to value acquisitions, plan developments, high-grade acreage and even used as collateral to lend oil companies money. The Arps equation is in widespread use in the oil industry for estimating ultimate recovery of a well given actual historical production data from early time in the life of an oil or gas well. Typically referred to as Decline Curve Analyses, these techniques were originally published in 1945 having been developed, tested and practiced for several decades to exploit "conventional" reservoirs. "Conventional" reservoirs are hydrocarbon-bearing reservoirs yielding hydrocarbon production that is dominated by fluid flow through minute connections and void spaces between the grains of rock containing the hydrocarbons (flow through porous media). For decades, widespread engineering knowledge taught in the classroom and practiced professionally in the industry has incorporated Arp's techniques.

There are two popular, basic forms of the Arps equations: (1) a hyperbolic decline function, and (2) an exponential decline function. In either function, the mathematical formalism describes the mechanisms driving production from the subsurface reservoir through the wellbore and up to the surface as infinite in total available drive energy and hydrocarbon storage. The industry, having known for decades that reservoir drive energy and recoverable resources cannot be infinite, have dealt with this problem by simply and abruptly terminating the forecast or estimate at some economic limit of the well production operation depending on commodity prices and operating costs. The use of an economic limit allowed the industry to benefit from the heuristic approach of Arps Decline Curve Analysis without having to address the flawed mathematical assumptions of infinite reservoir drive energy and size.

Still, the unrealistic, never-terminating nature of the popular decline analyses have been dealt with by widely accepted terminal decline rates in the range of 7%-10%. Furthermore, there is some level of production below which is uneconomic. This is reflected in the use of an economic cutoff for the rate of production.

Various drive mechanisms are described and listed below in order of their capability for recovery efficiency:

| Drive Mechanism | Recovery Efficiency |
| --- | --- |
| Gravity drainage | 50%-70% |
| Water drive | 20%-60% |
| Gas cap expansion drive | 20%-40% |
| Solution gas expansion drive | 20%-30% |

The pressure and temperature conditions at which the first bubble of gas comes out of solution in oil is known in industry at the "bubble point." At discovery, most liquid petroleum reservoir oils contain some natural gas in solution. Often the oil is saturated with gas when discovered, meaning that the oil is holding all the gas it can at the reservoir temperature and pressure. Occasionally, the oil will be under-saturated. In this case, as the pressure is lowered, the pressure at which the first gas begins to evolve from the oil is defined as the "bubble point." In their original condition, most reservoir oils include some natural gas in solution. The pressure at which this natural gas begins to come out of solution and form bubbles is known as the "bubble point pressure."

Other drive mechanisms include (i) expansion of the oil phase; and (ii) compression of the pore volume. Both mechanisms occur as the oil and the void spaces in which the oil lies experience lower pressure as the fluids are evacuated from the reservoir. In (i), the fluid itself expands as it is exposed to lower pressures than in situ, and in (ii) the void space compresses along with the lack of fluid support. With the focus in industry having shifted to exploiting "unconventionals" (source rocks directly), that have several orders of magnitude smaller void space networks, solution gas expansion is one drive mechanism considered to be important. Observation of "unexpected" declines in actual production data when that production is compared to Arps analysis are the subject of research.

In some examples, the phrases oil wells, oil pumps, drilling units, and other oil/gas extraction areas may be used interchangeably (e.g., collectively referred to as oil-gas extraction sites (OGES)).

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A computer-implemented method for projecting oil and gas production, the method comprising the steps of:
   receiving input from a user identifying a database containing information about an oil-gas extraction site (OGES), the information originating directly from sensors at the OGES;
   collecting production data from the database relating to the OGES;
   performing a decline curve analysis using a prediction engine to fit a first monotonically decreasing function with the collected production data to develop a first production forecast;
   determining a bubble point threshold using a bubble point estimator module;
   checking whether the bubble point threshold has already been achieved in the production data;
   if the bubble point threshold has already been achieved in the production data, determining a production transition point at which the first production forecast reaches the bubble point threshold;
   if the bubble point threshold has not already been achieved in the production data, generating a future projected first production forecast by projecting the first production forecast into the future;
   comparing the future projected first production forecast to the bubble point threshold to check whether the future projected first production forecast has reached the bubble point threshold;
   if the future projected first production forecast has reached the bubble point threshold, determining a production transition point at which the first production forecast reaches the bubble point threshold;
   if the future projected first production forecast has not reached the bubble point threshold, recursively projecting the first production forecast further into the future until it reaches the bubble point threshold;
   generating a second production forecast associated with a second monotonically decreasing function, wherein a combined production forecast comprises:
     a portion of the first production forecast extending up to, and terminating at the production transition point, and,
     a portion of the second production forecast starting at, and extending past the production transition point; and,
   sending the generated second production forecast for display to a user at a display device,
   wherein the first and second monotonically decreasing functions are different functions, and wherein the absolute value of the first derivative of the second monotonically decreasing function is greater than or equal to the absolute value of the first derivative of the first monotonically decreasing function for every value of production past the production transition point.

2. The computer-implemented method of claim 1, wherein the production data is selected from the group consisting of oil, gas, and barrel of oil equivalent (BOE) data.

3. The computer-implemented method of claim 1, wherein the first monotonically decreasing function comprises an Arps hyperbolic function.

4. The computer-implemented method of claim 3, wherein the second monotonically decreasing function comprises an Arps exponential function.

5. The computer-implemented method of claim 4, wherein the instantaneous hyperbolic decline rate of the Arps hyperbolic function at the production transition point is used as the terminal exponential decline rate in the Arps exponential function.

6. The computer-implemented method of claim 1, wherein the first monotonically decreasing function comprises a Duong decline function having fiddle factor $\alpha$ and the second monotonically decreasing function comprises a Duong decline function having a fiddle factor $\beta$, wherein $\alpha \neq \beta$.

7. The computer-implemented method of claim 1, further comprising the step of:
   receiving input from a user to select the type of decline curve analysis.

8. A computer-implemented method for projecting oil and gas production, the method comprising the steps of:
   receiving input from a user identifying a database containing information about an oil-gas extraction site (OGES), the information originating directly from sensors at the OGES;
   collecting production data from the database relating to the OGES;
   performing a decline curve analysis using a prediction engine to fit a first monotonically decreasing function with the collected production data to develop a first production forecast;
   determining a bubble point threshold using a bubble point estimator module;
   determining a production transition point at which the first production forecast reaches the bubble point threshold;
   generating a second production forecast associated with a second monotonically decreasing function, wherein a combined production forecast comprises:

a portion of the first production forecast extending up to, and terminating at the production transition point, and, a portion of the second production forecast starting at, and extending past the production transition point; and, sending the generated second production forecast for display to a user at a display device, wherein the first and second monotonically decreasing functions are different functions.

9. The computer-implemented method of claim 8, wherein the production data is selected from the group consisting of oil, gas, and barrel of oil equivalent (BOE) data.

10. The computer-implemented method of claim 8, wherein the first monotonically decreasing function comprises an Arps hyperbolic function.

11. The computer-implemented method of claim 10, wherein the second monotonically decreasing function comprises an Arps exponential function.

12. The computer-implemented method of claim 11, wherein the instantaneous hyperbolic decline rate of the Arps hyperbolic function at the production transition point is used as the terminal exponential decline rate in the Arps exponential function.

13. The computer-implemented method of claim 8, wherein the first monotonically decreasing function comprises a Duong decline function having fiddle factor $\alpha$ and the second monotonically decreasing function comprises a Duong decline function having a fiddle factor $\beta$, wherein $\alpha \neq \beta$.

14. The computer-implemented method of claim 8, wherein the absolute value of the first derivative of the second monotonically decreasing function is greater than or equal to the absolute value of the first derivative of the first monotonically decreasing function for every value of production past the production transition point.

15. The computer-implemented method of claim 8, wherein the absolute value of the effective decline rate of the second monotonically decreasing function is greater than or equal to the absolute value of the effective decline rate of the first monotonically decreasing function for every value of production past the production transition point.

16. The computer-implemented method of claim 8, further comprising the step of:

receiving input from a user to select the type of decline curve analysis.

17. A computer-implemented method for projecting oil and gas production, the method comprising the steps of:

receiving input from a user identifying a database containing information about an oil-gas extraction site (OGES), the information originating directly from sensors at the OGES;

collecting production data from the database relating to the OGES;

performing a decline curve analysis using a prediction engine to fit a first monotonically decreasing function with the collected production data to develop a first production forecast;

step for determining a bubble point threshold;

determining a production transition point at which the first production forecast reaches the bubble point threshold;

generating a second production forecast associated with a second monotonically decreasing function, wherein a combined production forecast comprises:

a portion of the first production forecast extending up to, and terminating at the production transition point, and, a portion of the second production forecast starting at, and extending past the production transition point; and, sending the generated second production forecast for display to a user at a display device, wherein the first and second monotonically decreasing functions are different functions.

18. The computer-implemented method of claim 17, wherein the production data is selected from the group consisting of oil, gas, and barrel of oil equivalent (BOE) data.

19. The computer-implemented method of claim 17, wherein the absolute value of the first derivative of the second monotonically decreasing function is greater than or equal to the absolute value of the first derivative of the first monotonically decreasing function for every value of production past the production transition point.

20. The computer-implemented method of claim 17, wherein the absolute value of the effective decline rate of the second monotonically decreasing function is greater than or equal to the absolute value of the effective decline rate of the first monotonically decreasing function for every value of production past the production transition point.

* * * * *